(12) United States Patent
Anderson

(10) Patent No.: US 6,249,316 B1
(45) Date of Patent: *Jun. 19, 2001

(54) METHOD AND SYSTEM FOR CREATING A TEMPORARY GROUP OF IMAGES ON A DIGITAL CAMERA

(75) Inventor: Eric C. Anderson, San Jose, CA (US)

(73) Assignee: FlashPoint Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/702,286

(22) Filed: Aug. 23, 1996

(51) Int. Cl.$^7$ .................................................. H04N 5/225
(52) U.S. Cl. ...................................... 348/333.05; 345/115
(58) Field of Search .................................... 348/333, 232, 348/552, 333.05; 345/338, 351, 115; 396/373, 429

(56) References Cited

U.S. PATENT DOCUMENTS

| | | | | |
|---|---|---|---|---|
| 4,827,347 | * | 5/1989 | Bell ................................... | 348/333.05 |
| 5,020,012 | | 5/1991 | Stockberger . | |
| 5,043,816 | * | 8/1991 | Nakano et al. ....................... | 348/333 |
| 5,237,648 | * | 8/1993 | Mills et al. ........................... | 395/133 |
| 5,414,811 | * | 5/1995 | Parulski et al. ....................... | 395/162 |
| 5,488,414 | * | 1/1996 | Hirasawa et al. .................... | 348/207 |
| 5,633,678 | * | 5/1997 | Parulski et al. ....................... | 348/232 |
| 5,635,984 | * | 6/1997 | Lee ........................................ | 348/333 |
| 5,675,358 | * | 10/1997 | Bullock et al. ....................... | 345/115 |
| 5,682,207 | * | 10/1997 | Takeda et al. ........................ | 348/568 |
| 5,706,049 | * | 1/1998 | Moghadam et al. ................. | 348/333 |
| 5,740,267 | * | 4/1998 | Erherer et al. ....................... | 382/132 |
| 5,742,339 | * | 4/1998 | Wakui ................................... | 348/233 |
| 5,796,428 | * | 8/1998 | Matsumoto .......................... | 348/231 |
| 5,828,406 | | 10/1998 | Parulski . | |
| 5,862,218 | * | 1/1999 | Steinberg ............................. | 348/552 |
| 5,943,050 | * | 8/1999 | Bullock et al. ................. | 348/333.05 |
| 5,966,122 | * | 10/1999 | Itoh ....................................... | 348/232 |

* cited by examiner

*Primary Examiner*—Wendy R. Garber
(74) *Attorney, Agent, or Firm*—Sawyer Law Group LLP

(57) ABSTRACT

A method and system for grouping a series of images stored in a digital camera. The digital camera includes a view finder for displaying a plurality of the image cells, where each of the image cells corresponds to one of the stored images. The digital camera also includes a navigation control button for positioning a highlight area around one of the plurality of image cells, and one or more function keys. The method and system includes assigning a mark function to one of the function keys, such that in response to the user pressing the assigned mark function key, the image cell currently highlighted is marked to provide a marked image. In response to the user repeating the above step, a group of marked images is created. The method and system further includes assigning at least one group function to one of the function keys, such that in response to a user pressing the assigned group function key, the group of marked images is collectively manipulated by the user.

12 Claims, 11 Drawing Sheets

METHOD AND SYSTEM FOR CREATING A TEMPORARY GROUP OF IMAGES ON A DIGITAL CAMERA

FIELD OF THE INVENTION

The present invention relates generally to digital cameras, and more particularly to a method and system for grouping images in a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

Due to architectural limitations of conventional digital cameras, there are several drawbacks in the user interface that restrict how captured images are manipulated by a user. The user interface in conventional digital cameras typically includes a view finder in which small versions of the captured images may be displayed to allow a user to review several images at once. By selecting one of the images, the user may then display the full-sized version of the images in the view finder.

Some digital cameras have a type of automatic mode that displays the full-sized versions of the captured images at some factory predetermined rate starting with the first image and ending with the last image. Another type of automatic mode allows the user to select the starting image in the playback sequence, rather than automatically starting with the first image that was captured.

The drawback with these types of automatic modes is that once playback begins, the images can only be displayed in the sequence in which they were taken. Therefore, the user cannot fully control the sequence that individual images are displayed, or randomly select a set of images to display.

Digital cameras that are not equipped with automatic mode require manual intervention by the user to display the captured images. That is, not only is the user forced to view images in a predetermined sequence, but after one image is displayed, the user must manually depress a button on the camera that triggers the display of the next image, depress the button again to display the next image, and so on for the entire sequence of images.

Manual intervention by the user is also necessary when performing other operations on the captured images, such a deleting images from the digital camera. Forcing users to manually select individual images for each operation desired can be cumbersome and tedious to the user.

Accordingly, what is needed is an improved system and method for manipulating and grouping captured images in a digital camera. The present invention addresses such a need.

SUMMARY OF THE INVENTION

The present invention provides method and system for grouping a series of images stored in a digital camera. The digital camera includes a view finder for displaying a plurality of the image cells, where each of the image cells corresponds to one of the stored images. The digital camera also includes a navigation control button for positioning a highlight area around one of the plurality of image cells, and one or more function keys. The method and system includes assigning a mark function to one of the function keys, such that in response to the user pressing the assigned mark function key, the image cell currently highlighted is marked to provide a marked image. In response to the user repeating the above step, a group of marked images is created. The method and system further includes assigning at least one group function to one of the function keys, such that in response to a user pressing the assigned group function key, the temporary group of marked images is collectively manipulated by the user.

According, to the system and method disclosed herein, a user may view and manipulate randomly selected images as a group without manual intervention, thereby increasing the ease of use and operation of the digital camera.

DESCRIPTION OF THE INVENTION

The present invention relates to an improvement in manipulating images in a digital camera. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for grouping a series of stored images. From the group of images, a user may then automatically display the images in the group, save the images in the group, or delete all of the images in the group at once, without manual intervention.

Figure 1:
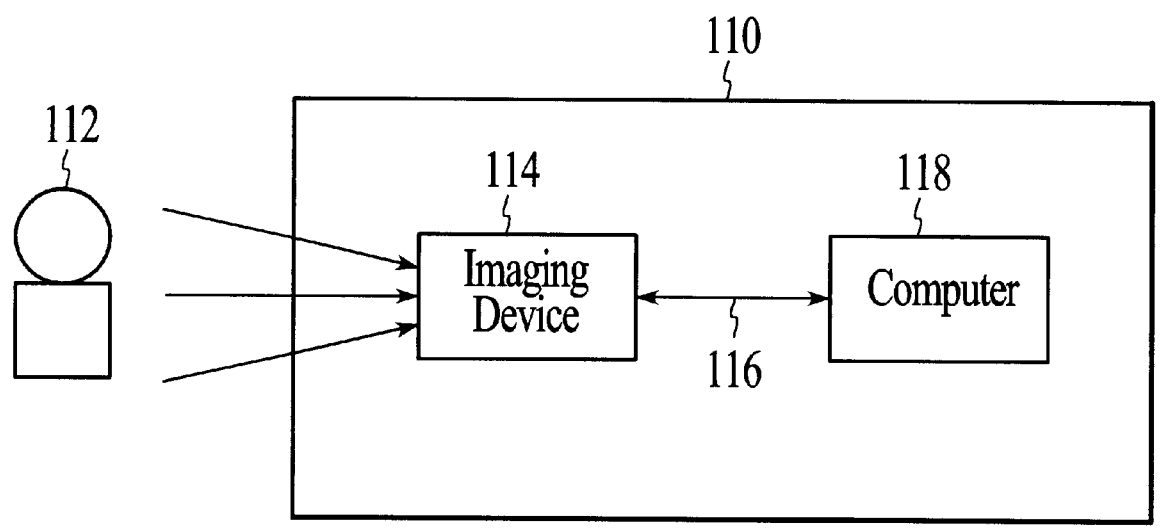
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
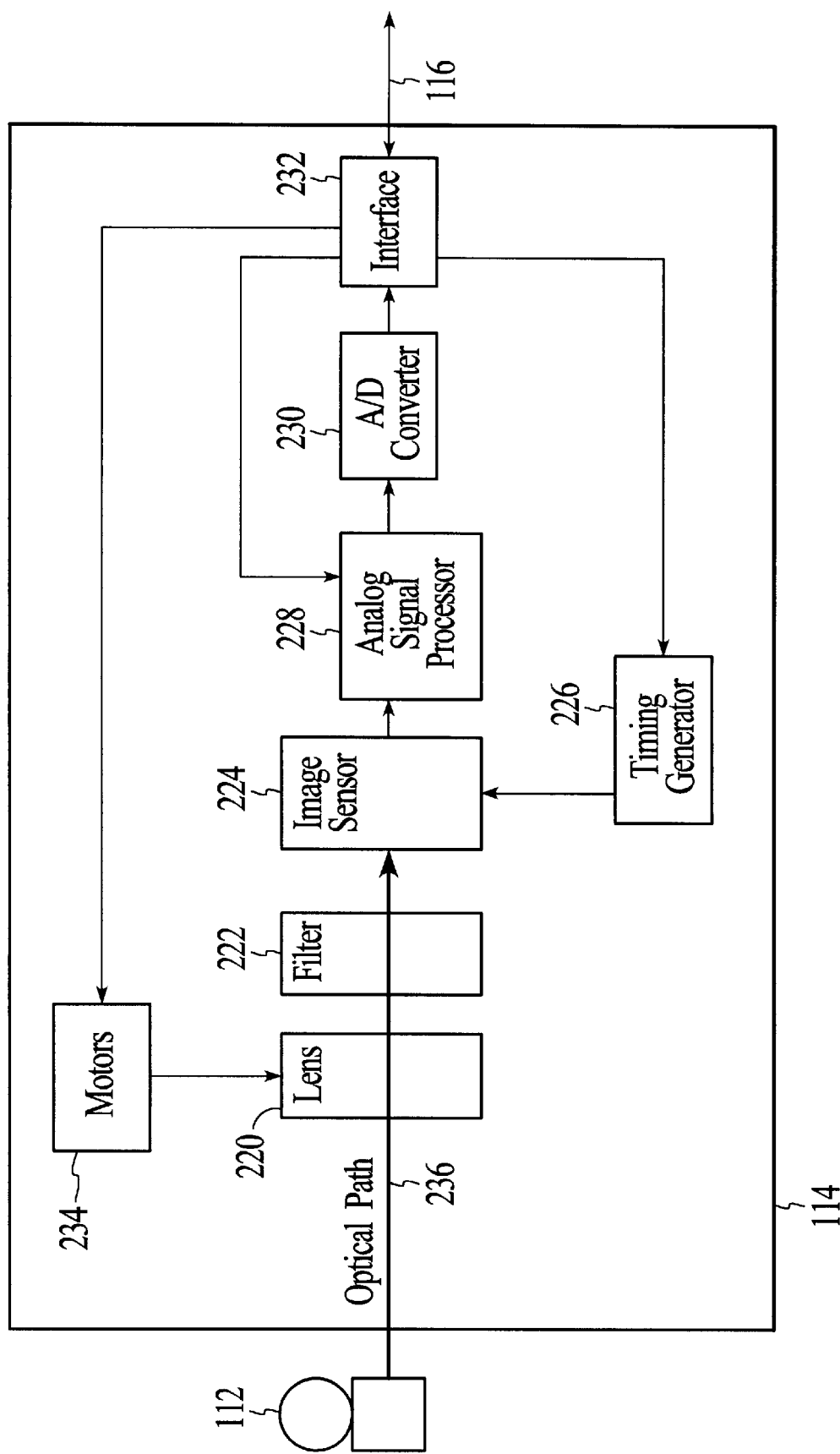
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
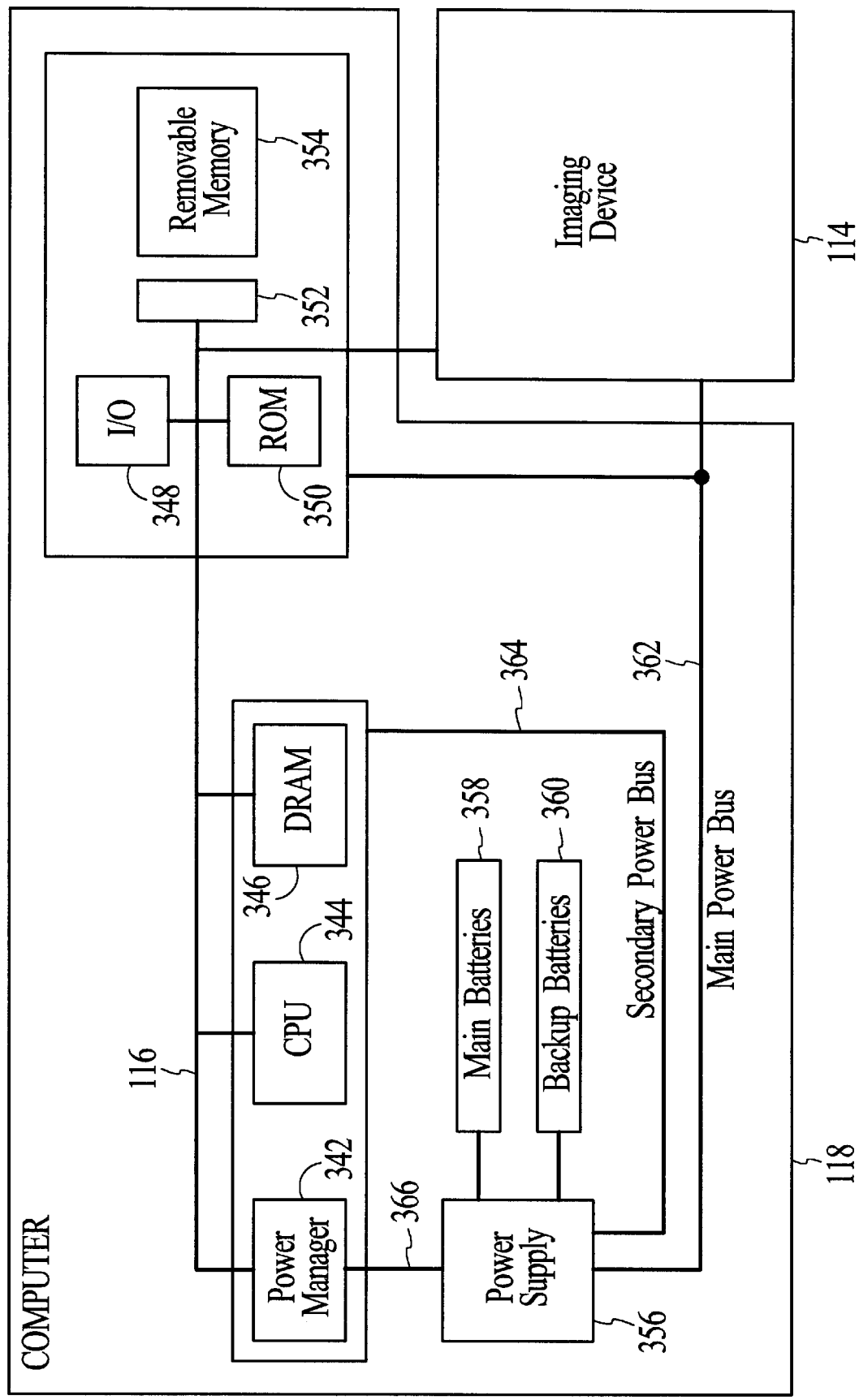
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

According to the present invention, the flexible architecture of the digital camera provides an improved method for manipulating images in a digital camera. More specifically, the present invention provides a method and system for grouping a series of captured images so that the images may be manipulated collectively without user intervention. In a preferred embodiment, the method and system for grouping a series of images is implemented by providing a marking and unmarking function within the user interface of the camera.

Figure 4:
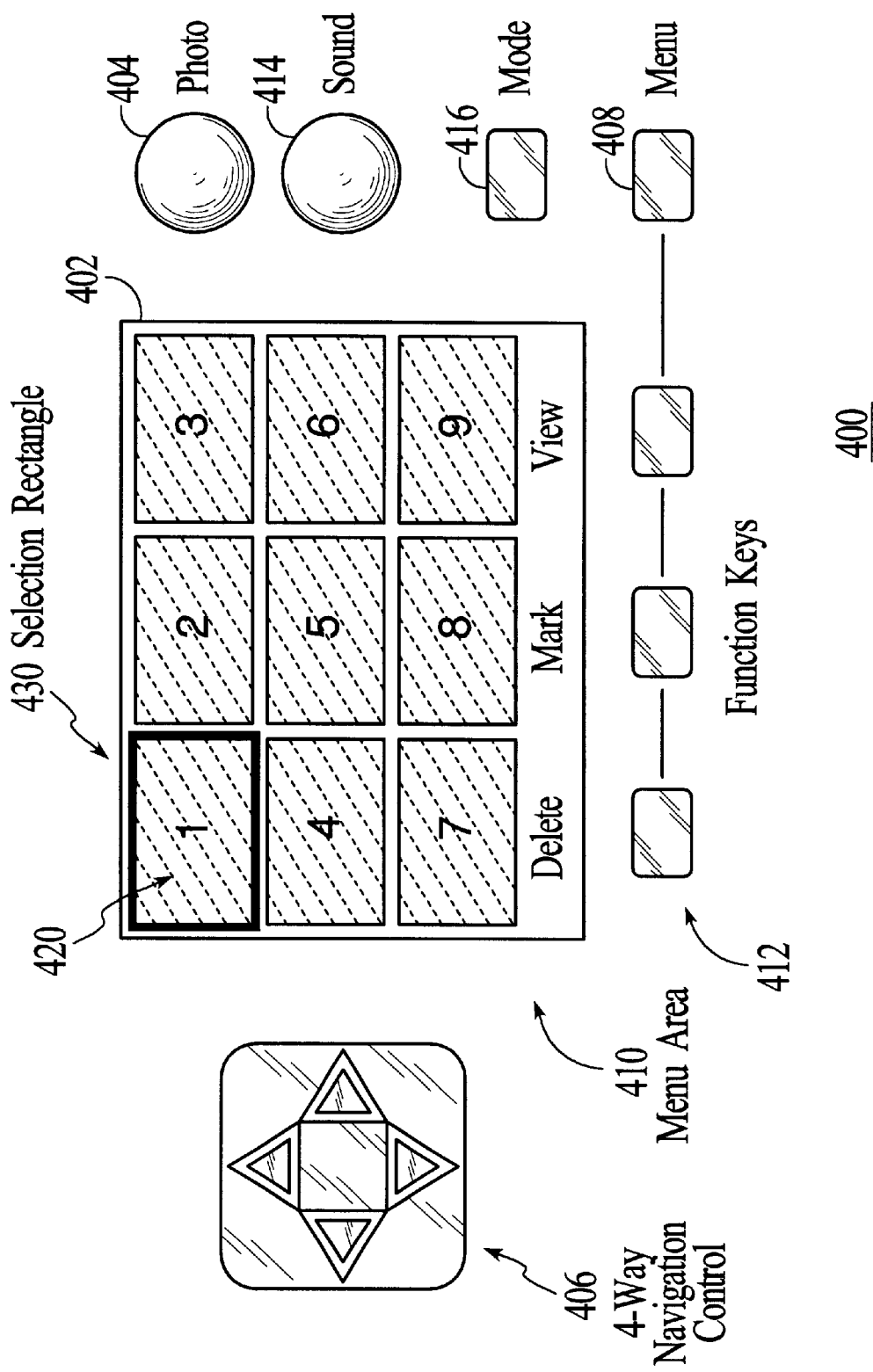
FIG. 4 is a diagram depicting a user interface for a digital camera that operates in accordance with the present invention.

FIG. 4 is a diagram depicting a user interface 400 for a digital camera that operates in accordance with the present invention. In one preferred embodiment, the user interface includes a view finder 402, an image capture button called a photo button 404, a four-way navigation control button 406, a menu button 408, a menu area 410 within the view finder 402, and function keys 412. The user interface may also include an optional sound button 414 and a mode button 416.

The particular layout of the user interface 400, however, is not important to implement the present invention. The user interface 400 is preferably located on back of the digital camera, but the user interface buttons may also be positioned in other locations on the camera. For example, the photo button 404 may be positioned on the top of the camera, instead of the back of the camera, etc.

Referring again to FIGS. 1 and 4, the user interface 400 operates in two modes: view finder mode and review mode. In a preferred embodiment, the photo button 404 is a two position button. The view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view finder 402. Review mode begins by pressing any other button on the interface 400.

Referring again to FIG. 4, once in the review mode, the view finder 402 displays a series of cells 420 that represent the digital images that have been captured in the digital camera. The view finder 402 is shown here as displaying nine image cells 420. Each cell 420 displays what's called a thumb nail of the digital image, which is a shrunken version of the digital image stored in the camera.

While in review mode, the user may navigate through a series of displayed cells 420 in the view finder 402 using the four-way navigation control 406. The cell 420 currently selected by the four-way navigation control 406 is encircled with a highlighted area 430, which in this embodiment is a selection rectangle; other shapes for the highlighted area are also suitable.

In a preferred embodiment, the function keys 412 of the user interface 400 are programmable, i.e., they may be assigned different functions. The function currently assigned to a respective function key 412 is indicated by several soft keys that are displayed in the menu area 410 of of the view finder 402. The soft keys displayed in the menu area 410 may be changed by pressing the menu key, which also changes the functions assigned to the function keys 412. The soft keys displayed in the menu area 410 are also changed automatically by the digital camera in response to user actions, as described further below.

Figure 5:
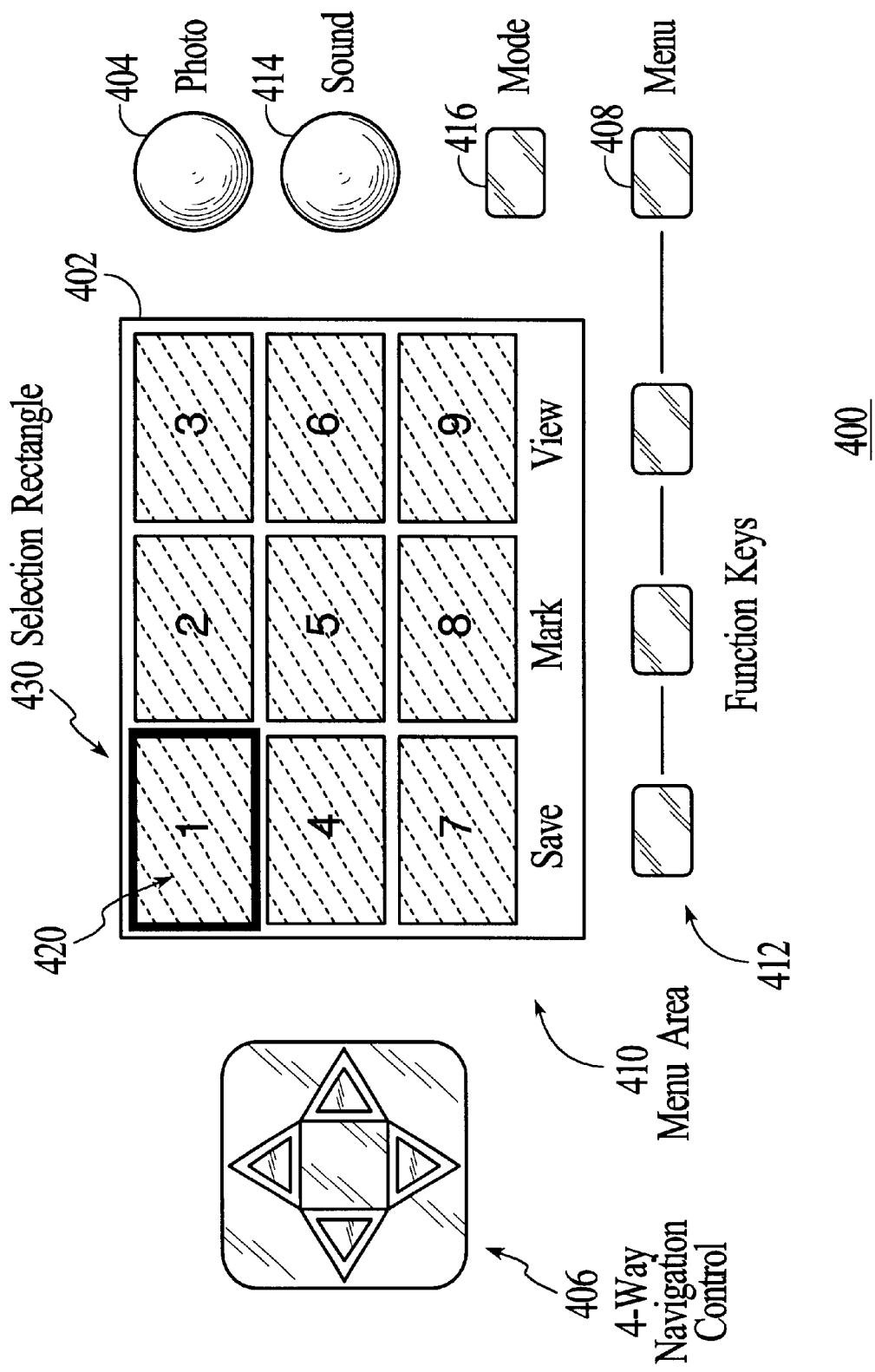
FIGS. 5 and 6 are diagrams illustrating additional softkey menu levels that are displayed in the view finder of the camera interface.
Figure 6:
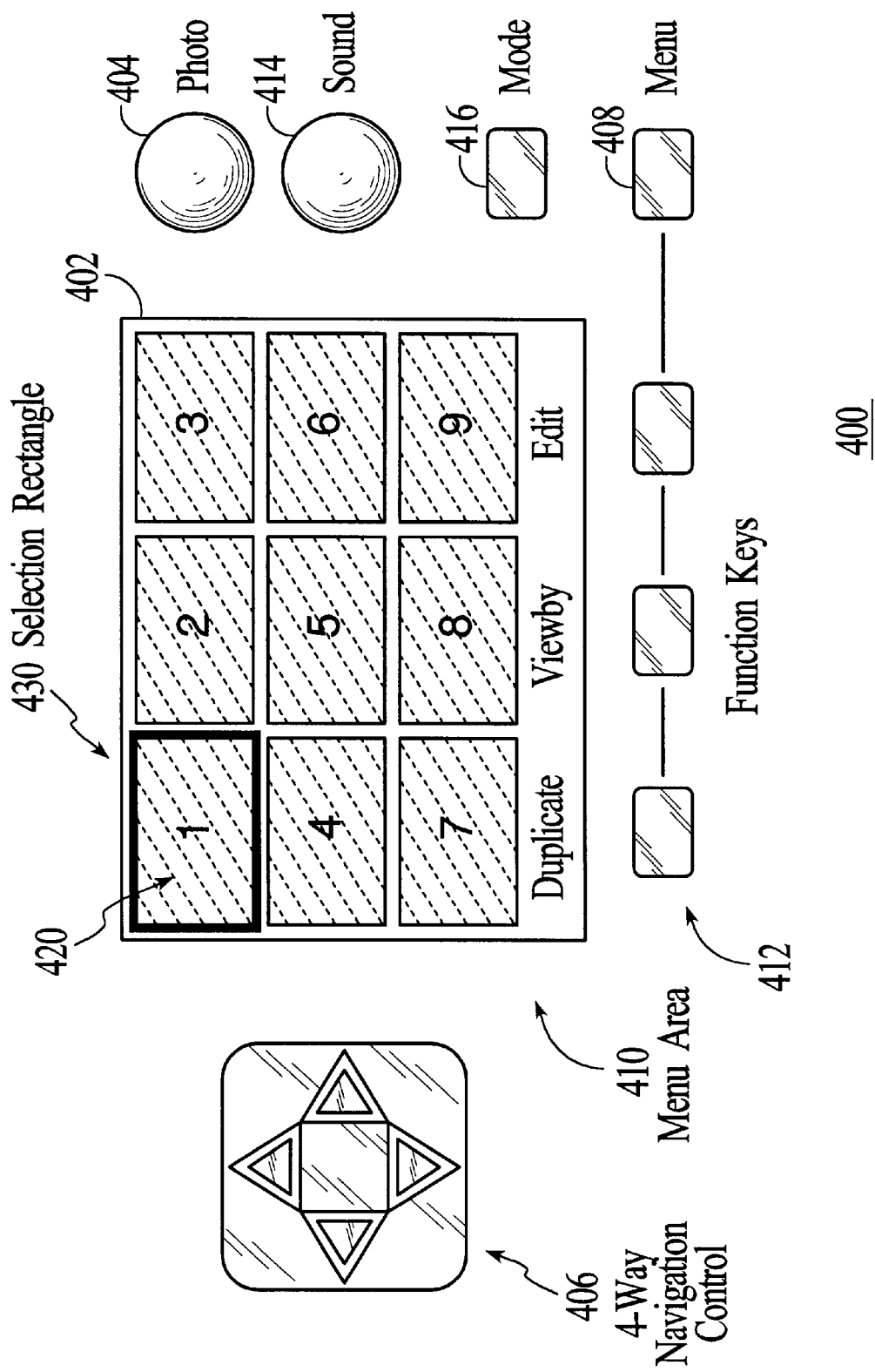

In a preferred embodiment, there are three levels of softkey functions may be displayed in the menu area 410. FIGS. 4–6 depict the menu area 410 displaying the three levels of softkey functions that are assigned to corresponding function keys 412. FIG. 4 shows the menu area 410 displaying the first level of soft keys; "Delete", "Mark", and "View". FIG. 5 shows the menu area 410 displaying the second level of soft keys; "Save", "Make", and "View". FIG. 6 shows the menu area 410 displaying the third level of soft keys; "Duplicate", "Viewby", and "Edit".

Referring again to FIG. 4, the "View" softkey is one of the softkeys displayed in the first menu level. Highlighting a cell 420 and pressing the function key 412 under the "View" soft key will cause the full-sized image to be displayed in the view finder 402.

According to the present invention, rather than performing operations on a single image at one time, a user can create a temporary group of images using the "Mark" softkey. After creating a group, the user may then perform functions on the group, such as deleting the group, or transforming the temporary group into a permanent group of images.

In a preferred embodiment of the present invention, a temporary group of images is created through the use of the "Mark" softkey. In response to the user pressing the function key 412 under the "Mark" softkey, a mark number is displayed in the image cell 420 of the highlighted image and the highlighted image becomes a marked image. After an image is marked, the Mark softkey in the menu area is replaced an "Unmark" softkey. This allows the user remove an image from the group, which removes the mark number from the image cell of the highlighted image.

The "Delete" softkey is the remaining softkey displayed in the first menu level. The delete function provided by the Delete softkey operates on a single image or on a group of marked images. If no images have been marked, then pressing the function key assigned to the delete function will delete the currently highlighted image. If several images have been marked, then pressing the delete function key 412 will delete the temporary group of marked images, even if the highlight area 430 is currently on a non-marked image. In either case, after pressing the delete function key 412, a dialog box or other type of prompt preferably appears asking the user to confirm the request to delete.

Referring again to FIG. 5, the "Save" and "Make" softkeys are functions that enable the user to create a permanent group of images from the temporary group of marked images. This may be accomplished in a variety of ways.

In one preferred embodiment, pressing the function key under the Save softkey creates a permanent group of images by saving all of the marked images into a folder or directory within the digital camera's DRAM 346 and/or removable memory 354. A dialog box or other type of prompt appears asking the user to name the folder. After the user names the folder, the folder is displayed as a new cell 420 in the view finder 402.

In a second preferred embodiment, pressing the save function key creates a permanent group of images by giving the images a common name so that they may sort together during a sort function. In another preferred embodiment, a permanent group of images is created by placing them physically next to each other.

Pressing the function key 412 under the "Make" softkey creates a permanent group by placing all of the marked images into one file, as opposed to a folder. This creates a "slide show" in which the marked images can be played back in the sequence that they were marked. After the Make function key is depressed, a dialog box or other type of prompt appears asking the user to name the file. After the user names the file, the file is displayed as a new cell 420 in the view finder 402. Highlighting the new slide show cell and pressing the view function causes each of the images included in the "slide show" to be individually displayed in the view finder 402 without user intervention.

According to the present invention, the Save and Make functions allow a group of marked images to be stored in the camera as a single item that can be viewed or played. This allows images to be categorized, e.g., images of a beach scene could be placed in an outdoor category, a family category, an ocean category, a vacation category, or any combination of the above. Instead of creating a duplicate of the image and storing the image in each category, each category would include a pointer to the stored image.

The "Label" softkey is the remaining softkey displayed in the second menu level. Highlighting a folder cell or slide show cell and pressing the function key associated with the Label softkey enables the user to label a folder or file of images with a category name (e.g. beach scenes).

Referring now to FIG. 6, the "Duplicate" softkey operates on a currently highlighted image. Pressing the duplicate function key causes the highlighted marked image to be duplicated. The "Viewby" softkey operates on all images. Pressing the viewby key allows the user to view cells by some criteria, such as by date and time, for example.

Figure 7:
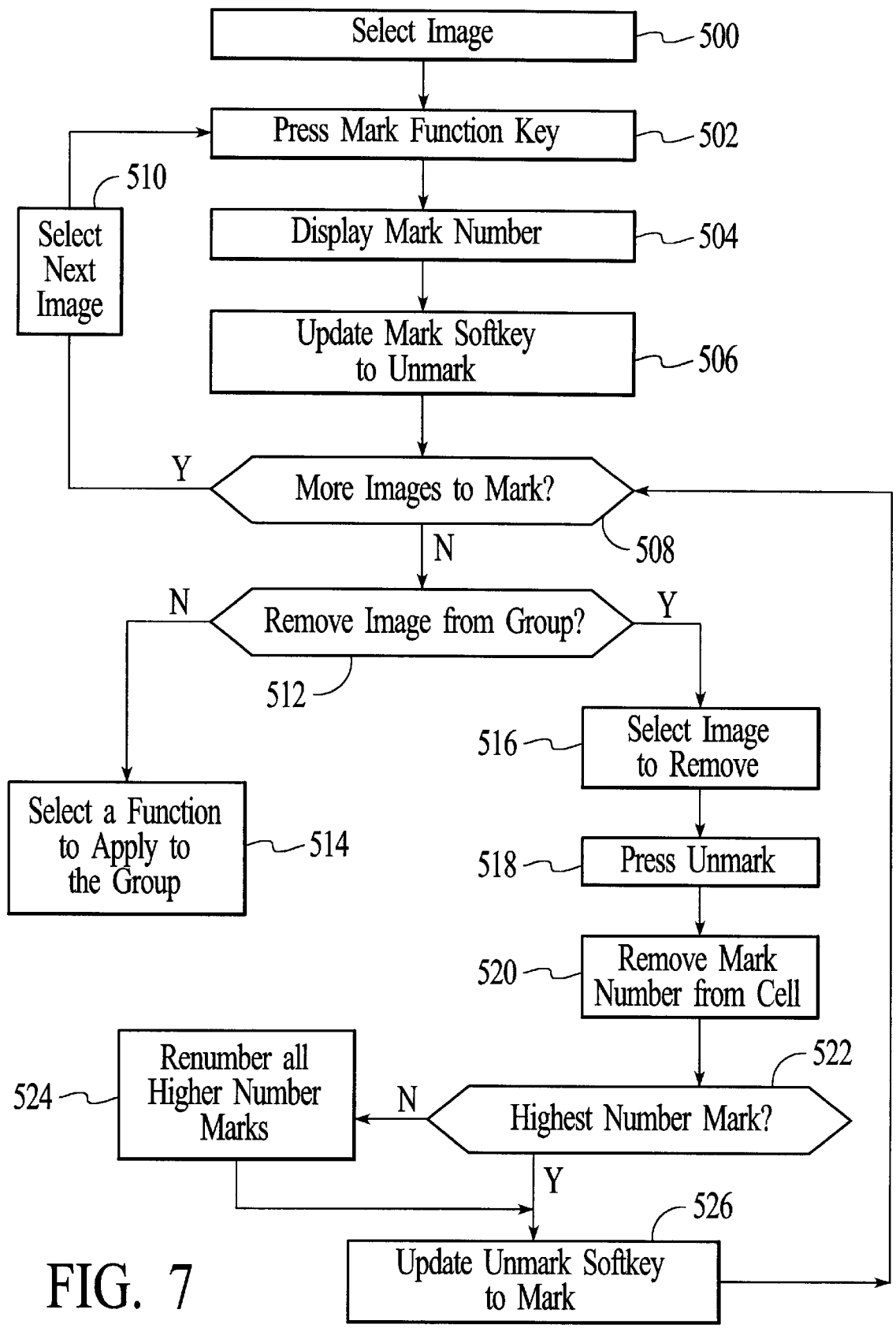
FIG. 7 is flow chart depicting the process for grouping images that are stored in a digital camera in accordance with the present invention.

According to the present invention, a user may randomly create an ordered group of images using the four-way navigation control 406, the menu button 408, the menu area 410, and the programmable function keys 412, as shown in FIG. 7.

FIG. 7 is a flowchart depicting the process of creating an ordered group of images in accordance with the present invention.

The process begins when a user selects an image by positioning the highlight area 430 over the image cell using the four-way navigational control button in step 500. The user then presses the function key corresponding to the Mark softkey in step 502. After the mark key is depressed, the cell is updated to display the number of images that have been marked during the current sequence in step 504. The cell may also be updated to display an optional graphic, such as a check-mark for example. After the image cell has been updated, the mark softkey in the menu area is updated to "Unmark" in step 506.

Next, the user decides whether to add more images to the temporary set of marked images in step 508. If the user decides to add more images, then the user selects the next image by positioning the highlight area over the image using the four-way navigational control button in step 510.

If the user decides not to add more images to the temporary group of marked images in step 508, then the user decides whether to remove any of the marked images from the group in step 512. If the user decides not to remove any of the marked images from the group, then the user may select a function, such as "Delete", "Save", and "Make", to apply to the group in step 514.

If the user decides to remove a marked image from the group, then the group is dynamically modified as follows. The user first selects the image to be removed by positioning the highlight area over the marked image using the fourway navigational control button in step 516. The user then presses the function key corresponding to the Unmark softkey in step 518.

After the unmark key is depressed, the cells for the remaining marked images may be renumbered. This is accomplished by determining whether the selected image is the highest numbered image in the marked group in step 522. If the selected image is not the highest numbered image in the marked group, then the marked images having a higher number are renumbered by subtracting one from the respective mark number and displaying the result in their cells in step 524. After the mark number is removed from the unmarked image and the other mark numbers renumbered if required, the unmark softkey in the menu area is updated to "Mark" in step 526. The user may then continue to modify the group by marking and/or unmarking other images accordingly.

The process of grouping images in the digital camera will now be explained by way of a specific example with reference to FIGS. 8–11.

Figure 8:
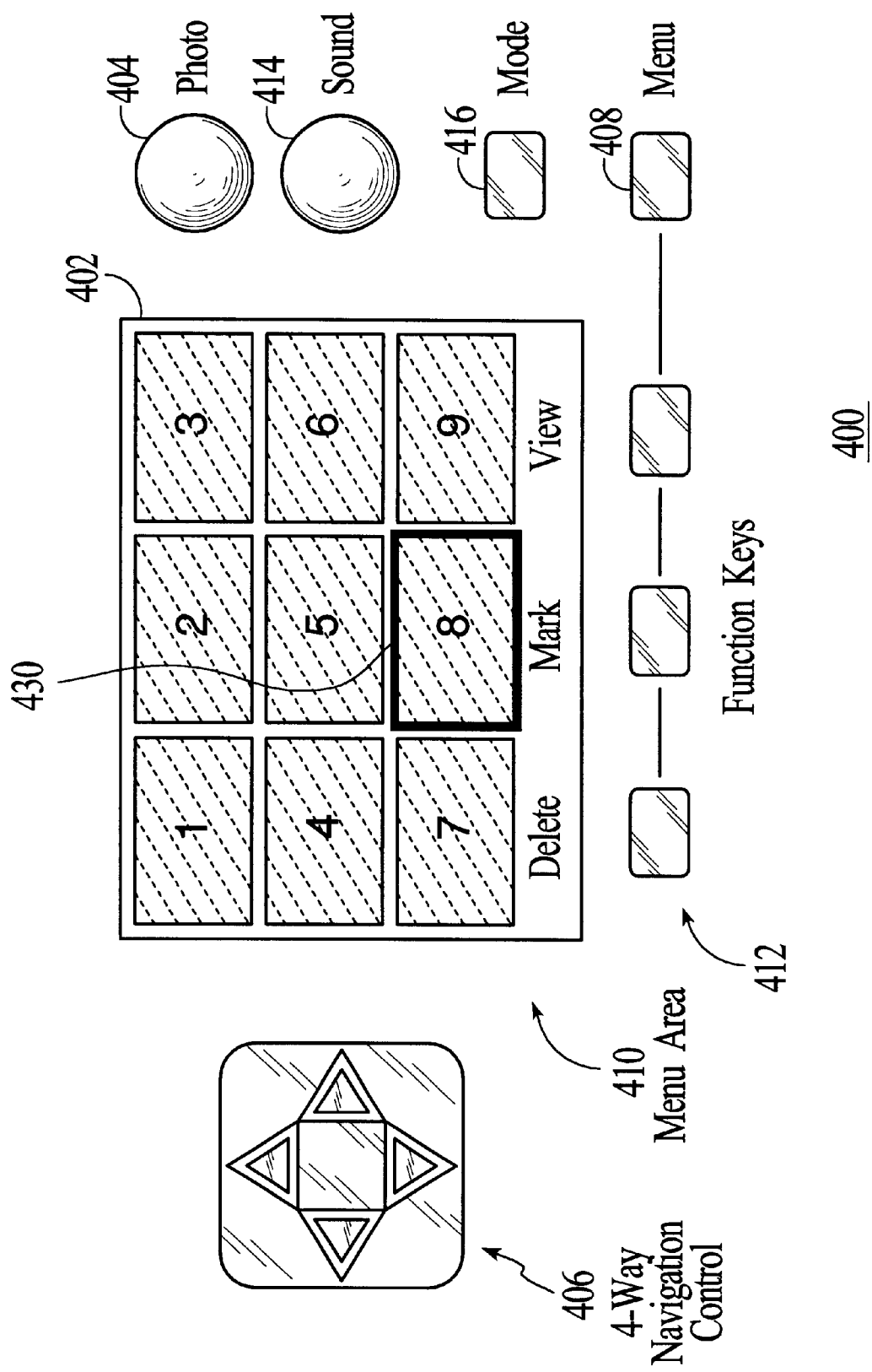
FIGS. 8–11 are diagrams illustrating the user interface as the user groups images in the digital camera in accordance with the present invention.

Referring to FIG. 8, assume that the user wishes to create a group of images beginning with the image cell highlighted with the highlighted area 430. At this point, the soft keys displayed in the menu area 410 are prompts to the user that the user may perform the displayed functions, such as "Mark", on the highlighted image. The mark function is then performed by the user pressing the Mark function key that is associated with the "Mark" soft key.

Figure 9:
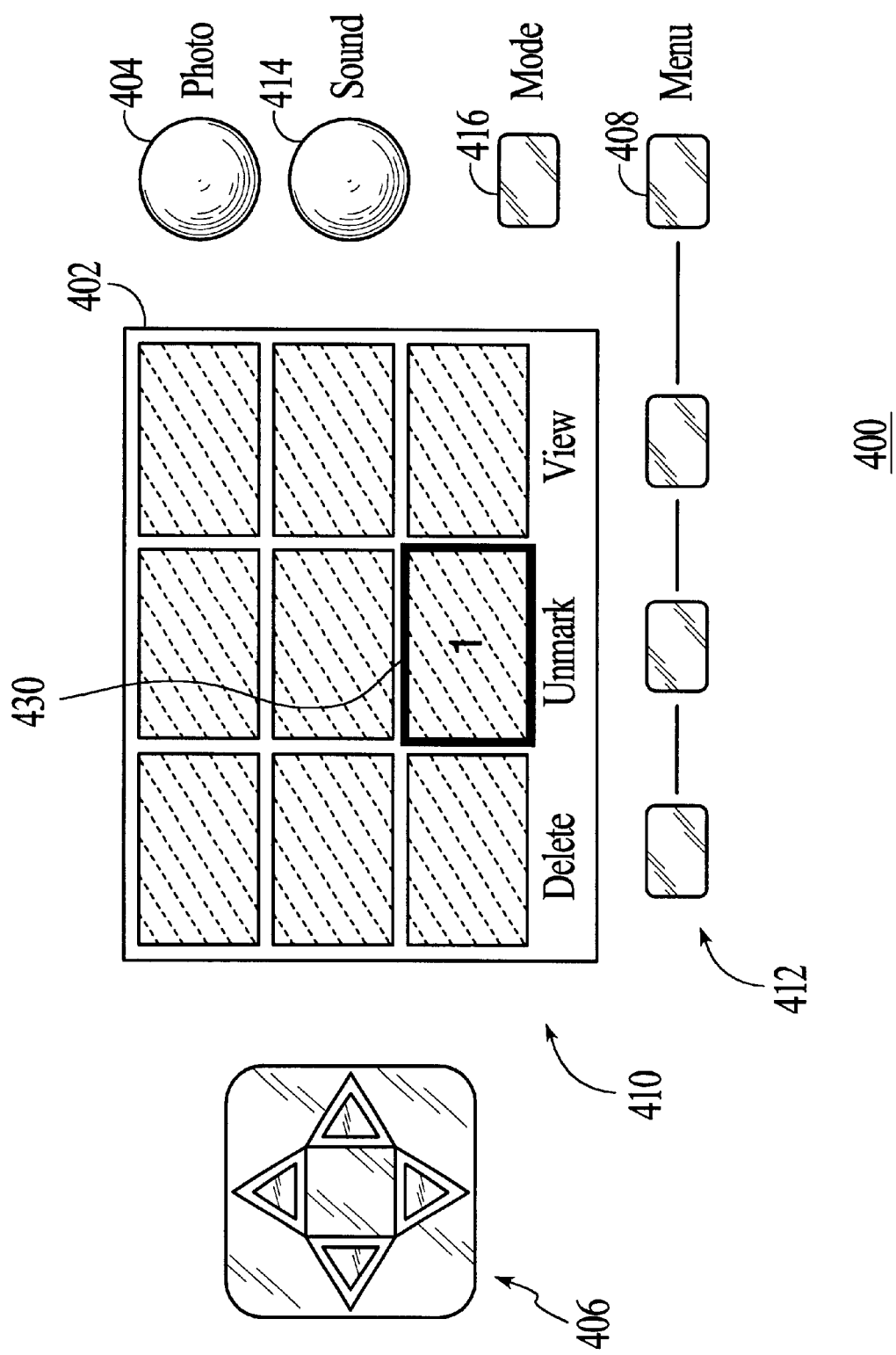

FIG. 9 is a diagram showing the result of the user pressing the Mark function key. The highlighted image cell 430 is updated with the number "1", which indicates that the image is the first to be marked. After marking the image, the menu area 410 is automatically updated with the "UnMark" soft key. Pressing the corresponding UnMark function key would result in the number "1" being removed from the image cell.

Figure 10:
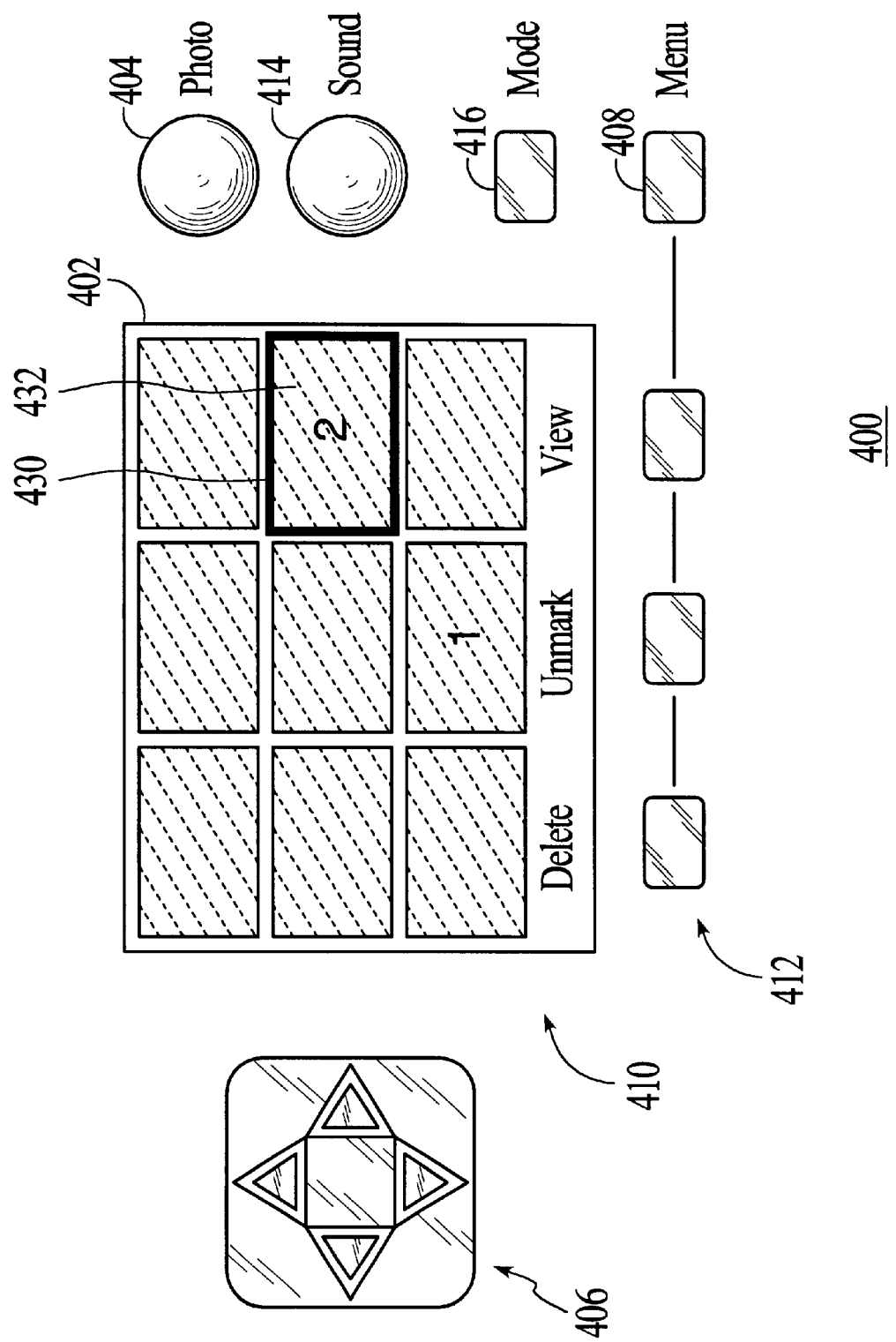

FIG. 10 is a diagram showing the user marking another image by positioning the highlight area 430 over a second image cell 432 and pressing the Mark function key. This causes the highlight image cell 432 to be updated with the number "2". As a result of marking the image, the menu area 410 is automatically updated with the "UnMark" soft key.

Figure 11:
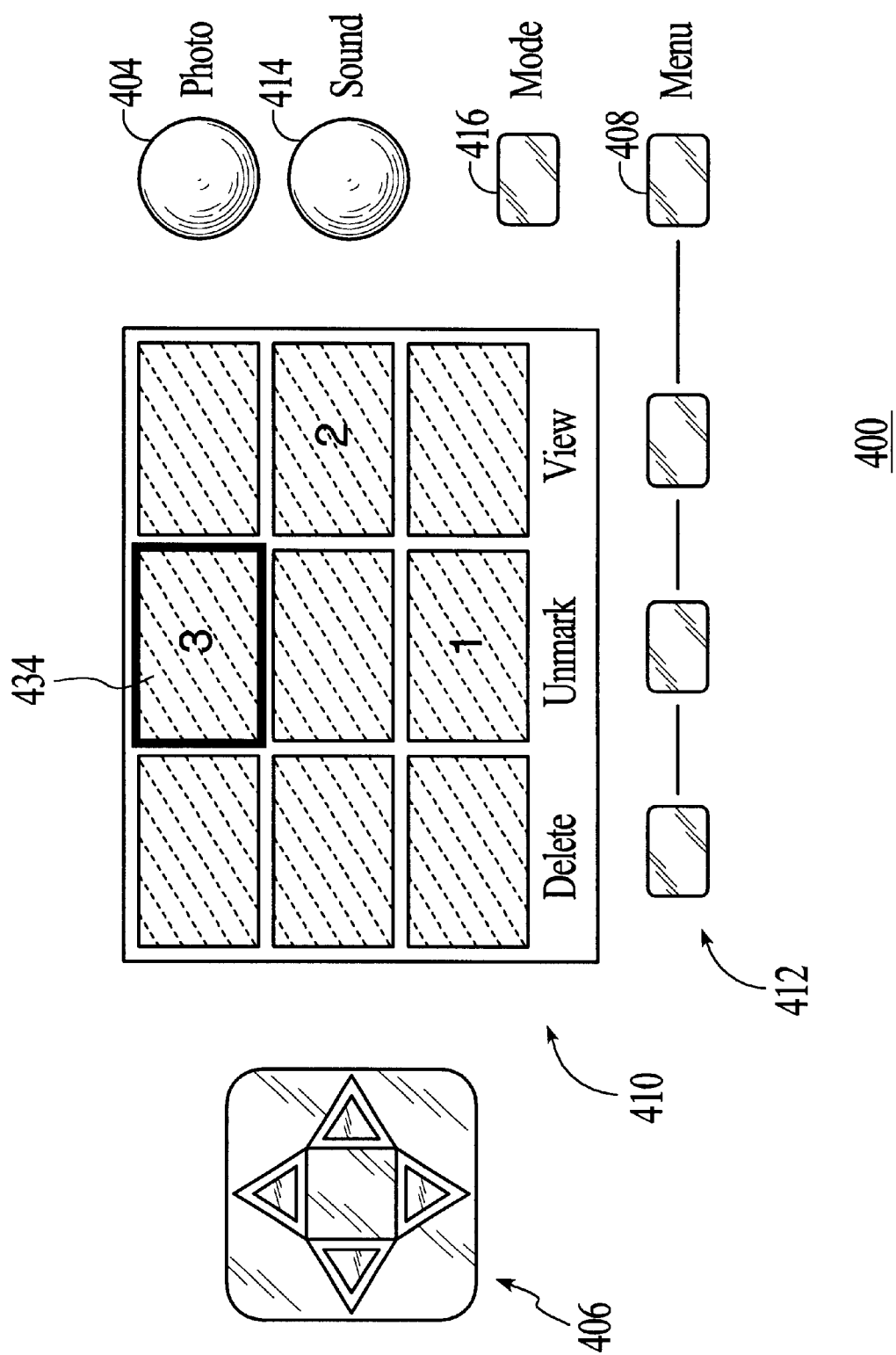

FIG. 11 is a diagram showing a third image being selected and marked, as described above, in which case, the icon area of the image 434 is updated with the number "3".

Referring again to FIG. 7, while marking images, the method for removing images in the group (steps 512–524) also allows a user to dynamically reorder or re-sequence the images in the group. For example, assume the user has marked five images, labeled as "1", "2", "3", "4", "5", and wants to make image "3" the last image in the group. This can be accomplished by unmarking image "3", which results in images "4", and "5" being renumbered "3" and "4", respectively. Thereafter, the user may mark the original image "3", which results in the image being labeled with the number "5".

After the group has been created with the chosen images in the desired sequence, the user may manipulate the marked images using functions chosen from the menu levels. Using the group functions provided by the programmable softkeys, the user may save the group into a folder, create a slide show, view the group, or delete the group.

A method and system for grouping images in a digital camera has been disclosed that is an improvement in the way images may be manipulated in a digital camera. Although the present invention has been described in accordance with the embodiments shown, one of ordinary skill in the art will readily recognize that there could be variations to the embodiments and those variations would be within the spirit and scope of the present invention.

For example, many methods may be chosen for displaying optional functions that may be performed on the images. For instance, the soft keys shown may be displayed on any menu level according to the application, or the softkeys may be replaced with actual buttons on the camera interface. Also, instead of displaying the soft keys in the menu area 410 itself to indicate whether the selected image will be marked, unmarked or duplicated, a dialog box may be displayed in the view finder 402 that prompts the user whether they want the current image to be marked, unmarked, or duplicated.

Accordingly, many modifications may be made by one of ordinary skill in the art without departing from the spirit and scope of the appended claims.

What is claimed is:

1. A method for grouping a series of images stored in a digital camera, the digital camera including a view finder for displaying the stored images, a navigation control button, and one or more function keys, the method comprising the steps of:

(a) allowing a user to navigate among the displayed images using the navigation control button;

(b) allowing the user to randomly select one of the displayed images;

(c) assigning a mark function to one of the function keys, such that in response to a user pressing the assigned mark function key, the image currently selected is marked to provide a marked image;

(d) repeating steps (a) through (c) to create a temporary group of marked images; and (e) assigning at least one group function to one of the function keys, such that in response to the user pressing the assigned group function key, the group of marked images is collectively manipulated by the user within the digital camera.

2. A method as in claim 1 wherein step (e) further includes the step of:

(e1) providing a view function as the at least one group function, such that in response to a user pressing the assigned view function key, each of the marked images is displayed sequentially in the view finder without manual intervention.

3. A method as in claim 1 wherein step (e) further includes the step of:
   (e1) providing a save function as the at least one group function, such that in response to a user pressing the assigned save function key, a permanent group of images is created by saving each of the marked images in a folder.

4. A method as in claim 1 wherein step (e) further includes the step of:
   (e1) providing a slide show function as the at least one group function, such that in response to a user pressing the assigned slide show function key, a permanent group of images is created by saving each of the marked images in a file.

5. A method as in claim 1 wherein step (e) further includes the step of:
   (e1) providing a duplicate function as the at least one group function, such that in response to a user pressing the assigned duplicate function key, each of the marked images are duplicated, and if no images have been marked, then the image currently selected is duplicated.

6. A method as in claim 1 wherein step (e) further includes the step of:
   (e1) providing a delete function as the at least one group function, such that in response to a user pressing the assigned delete function key, each of the marked images is deleted, and if no images have been marked, then the image currently selected is deleted.

7. A method as in claim 1 further including the step of:
   (f) assigning an unmark function to one of the function keys, such that in response to the user pressing the assigned unmark function key, the mark number is removed from the image currently selected is unmarked.

8. A method for grouping a series of images stored in a digital camera, the digital camera including a navigation control button, one or more function keys, and a view finder for displaying stored images, the method comprising the steps of:
   (a) allowing a user to navigate among the displayed images using the navigation control button;
   (b) allowing the user to randomly select one of the displayed images;
   (c) enabling the user to mark the selected image using a corresponding function key;
   (d) displaying a mark indication on the selected image in response to the user pressing the corresponding function key;
   (e) repeating steps (a) through (d) to provide a temporary group of marked images;
   (f) enabling the user to select one of the functions of saving the group, deleting the group, and creating a slide show from the group using a corresponding function key; and
   (g) saving the group, deleting the group, and creating a slide show from the group in response to the user pressing the appropriate function key.

9. A method as in claim 8 wherein step (d) further includes the step of:
   (d1) providing a mark number as the mark indication.

10. A method as in claim 9 further including the steps of:
    (h) allowing the user to unmark the selected image using a corresponding function key; and
    (i) removing the mark indication from the selected image in response to the user pressing the corresponding function key.

11. A method as in claim 10 wherein step (a) further includes the step of:
    (b1) prompting the user to duplicate the selected image using a corresponding function key; and
    (b2) duplicating the selected image in response to the user pressing the corresponding function key.

12. A digital camera device comprising:
    a memory device for storing sets of image data;
    a memory manager for allocating storage locations within said memory device to store said sets of image data;
    an interface coupled to said memory device whereby an external host computer can access said sets of image data stored in said memory device;
    a user interface for displaying a plurality of images corresponding to the image data, the user interface including a plurality of function keys, and means to navigate among and randomly select one of the plurality of images;
    means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
    means coupled to the memory manager for assigning at least one group function to one of the function keys, such that in response to a user pressing the assigned group function key, the group of marked images is collectively manipulated by the user, within the digital camera.

* * * * *

UNITED STATES PATENT AND TRADEMARK OFFICE
CERTIFICATE OF CORRECTION

PATENT NO. : 6,249,316 B1
APPLICATION NO. : 08/702286
DATED : June 19, 2001
INVENTOR(S) : Eric C. Anderson It is certified that error appears in the above-identified patent and that said Letters Patent is hereby corrected as shown below:

Claim 7, Column 9
Lines 30-34, change
"(f) assigning an unmark function to one of the function keys, such that in response to the user pressing the assigned unmark function key, the mark number is removed from the image currently selected is unmarked."
to
--(d) assigning an unmark function to one of the function keys, such that in response to the user pressing the assigned unmark function key, the image currently selected is unmarked.--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,249,316 C1 | |
| APPLICATION NO. | : 90/009691 | |
| DATED | : June 21, 2011 | |
| INVENTOR(S) | : Eric C. Anderson | |

It is certified that error appears in the above-identified patent and that said Letters Patent is hereby corrected as shown below:

Page 7, first column, line 1, change "DCS" to --DSC--; and
   first column, line 5, after "500" insert --Series--.

Column 1, lines 39 and 65, change "a" to --the--.

Column 3, line 23, change "the" to --a--;
   line 27, after "created" insert --,--;
   line 34, change "a" to --the--; and
   line 45, change "image" to --images--.

Column 4, line 19, change "a" to --the--;
   line 29, change "image" to --images--;
   line 41, change "13" to --23--; and
   line 43, after "grid" insert --of--.

Column 5, lines 9, 35 and 65, change "a" to --the--.

Column 6, line 20, after "least" insert --one--;
   line 25, after "with" insert --the--;
   line 45, change "a" to --the--; and
   line 59, after "images" insert --is--.

Column 7, lines 20 and 47, change "a" to --the--.

Column 11, line 28, change "the" (first occurrence) to --a--;
   line 42, change "conform" to --confirm--;
   delete lines 55-57 (claim 73) in their entirety without prejudice or disclaimer;
   line 58, change "74" to --73--, and change "73" to --72--;
   line 61, change "75" to --74--, and change "74" to --73--; and Signed and Sealed this
Fourth Day of October, 2011

David J. Kappos
*Director of the United States Patent and Trademark Office*

CERTIFICATE OF CORRECTION (continued)
U.S. Pat. No. 6,249,316 C1 line 65, change "76" to --75--, and change "73" to --72--.

Column 12, line 1, change "77" to --76--;
    line 7, change "78" to --77--;
    line 11, change "79" to --78--, and change "78" to --77--;
    line 13, change "80" to --79--, and change "79" to --78--;
    line 15, change "81" to --80--, and change "79" to --78--;
    line 17, change "82" to --81--, and change "79" to --78--;
    line 19, change "83" to --82--, and change "78" to --77--;
    line 21, change "84" to --83--, and change "78" to --77--;
    delete lines 23-27 (claim 85) in their entirety without prejudice or disclaimer;
    line 28, change "86" to --84--;
    line 33, change "87" to --85--, and change "86" to --84--;
    line 35, change "88" to --86--;
    line 50, change "the" (first occurrence) to --a--; and
    line 57, change "a" to --the--.

Column 13, line 4, change "89" to --87--, and change "88" to --86--;
    line 6, change "90" to --88--, and change "89" to --87--;
    line 8, change "81" to --89--;
    line 23, change "the" (first occurrence) to --a--;
    line 41, change "92" to --90--; and
    line 56, change "the" (first occurrence) to --a--.

Column 14, line 10, change "93" to --91--, and change "92" to --90--;
    line 14, change "94" to --92--;
    line 29, change "the" (first occurrence) to --a--;
    line 51, change "95" to --93--, and change "94" to --92--;
    line 58, change "96" to --94--, and change "95" to --93--; and
    line 61, change "97" to --95--, and change "96" to --94--.

Column 15, line 1, change "98" to --96--, and change "97" to --95--;
    line 3, change "99" to --97--;
    line 18, change "the" (first occurrence) to --a--;
    line 33, change "100" to --98--, and change "99" to --97--;
    line 38, change "101" to --99--, and change "96" to --97--;
    line 40, change "102" to -- 100--, and change "99" to --97--;
    line 45, change "103" to --101--; and
    line 60, change "the" (first occurrence) to --a--.

Column 16, line 12, change "104" to --102--;
    line 27, change "the" (first occurrence) to --a--;
    line 34, change "a" to --the--;
    line 45, change "105" to --103--; and
    line 60, change "the" (first occurrence) to --a--.

CERTIFICATE OF CORRECTION (continued)
U.S. Pat. No. 6,249,316 C1

Column 17, line 3, change "a" to --the--;
        line 14, change "106" to --104--;
        line 29, change "the" (first occurrence) to --a--;
        line 36, change "a" to --the--;
        line 57, change "107" to --105--, and change "106" to --104--; and
        line 66, change "108" to --106--, and change "107" to --105--.

Column 18, line 4, change "109" to --107--, and change "107" to --105--;
        line 10, change "110" to --108--, and change "106" to --104--;
        line 20, change "111" to --109--, and change "110" to --108--;
        line 27, change "112" to --110--, and change "111" to --109--;
        line 30, change "113" to -- 111--, and change "112" to --110--;
        line 36, change "114" to --112--, and change "106" to --104--;
        line 39, change "115" to --113--, and change "106" to --104--;
        line 44, change "116" to --114--, and change "106" to --104--; and
        line 64, change "117" to --115--, and change "116" to --114--.

Column 19, line 8, change "118" to --116--, and change "117" to --115--.

Column 20, line 7, change "119" to --117--, and change "116" to --114--.

(12) EX PARTE REEXAMINATION CERTIFICATE (8333rd)
United States Patent
Anderson

(10) Number: US 6,249,316 C1
(45) Certificate Issued: Jun. 21, 2011

(54) METHOD AND SYSTEM FOR CREATING A TEMPORARY GROUP OF IMAGES ON A DIGITAL CAMERA

(75) Inventor: Eric C. Anderson, San Jose, CA (US)

(73) Assignee: Flashpoint Technology, Inc., San Jose, CA (US)

Reexamination Request:
No. 90/010,681, Oct. 8, 2009
No. 90/009,691, Feb. 22, 2010

Reexamination Certificate for:
Patent No.: 6,249,316
Issued: Jun. 19, 2001
Appl. No.: 08/702,286
Filed: Aug. 23, 1996

Certificate of Correction issued Feb. 10, 2009.

(51) Int. Cl.
*H04N 5/225* (2006.01)

(52) U.S. Cl. ............. 348/333.05; 345/635; 345/642
(58) Field of Classification Search .......... None
See application file for complete search history.

(56) References Cited

U.S. PATENT DOCUMENTS

| | | | |
|---|---|---|---|
| 2,289,555 A | 7/1942 | Simons | |
| 3,814,227 A | 6/1974 | Hurd, III et al. | |
| 3,971,065 A | 7/1976 | Bayer | |
| 3,991,625 A | 11/1976 | Preston | |
| 4,011,571 A | 3/1977 | Okuzawa | |
| 4,017,680 A | 4/1977 | Anderson et al. | |
| 4,125,111 A | 11/1978 | Hudspeth et al. | |
| 4,158,208 A | 6/1979 | Dischert | |
| 4,172,327 A | 10/1979 | Kuehn et al. | |
| 4,195,317 A | 3/1980 | Stratton | |

(Continued)

FOREIGN PATENT DOCUMENTS

| EP | 0122094 A2 | 10/1984 |
|---|---|---|
| EP | 0421769 A2 | 4/1991 |
| EP | 0422447 A2 | 4/1991 |
| EP | 0463856 A2 | 1/1992 |
| EP | 0519379 A2 | 6/1992 |
| EP | 0528084 A1 | 2/1993 |
| EP | 0555048 A2 | 8/1993 |
| EP | 0568468 A2 | 11/1993 |
| EP | 0617542 A2 | 9/1994 |
| EP | 0650125 A1 | 4/1995 |

(Continued)

OTHER PUBLICATIONS

Kodak Professional Digital Camera System (DSC 100) User'Manual, Eastman Kodak Company (1991).

Foley et al., *Computer Graphics—Principles and Practice, Second Edition in C*, Addison–Wesley Publishing Company, New York, 1996, pp. 132–137, 506–509, 755–759.

Buderi, Robert, "Photos That Talk," *Upside Today*, Jan. 27, 1999, <http://www.upside.com/texis/mvm/story?id=36b0cb860>.

(Continued)

*Primary Examiner*—Andrew L Nalven

(57) ABSTRACT

A method and system for grouping a series of images stored in a digital camera. The digital camera includes a view finder for displaying a plurality of the image cells, where each of the image cells corresponds to one of the stored images. The digital camera also includes a navigation control button for positioning a highlight area around one of the plurality of image cells, and one or more function keys. The method and system includes assigning a mark function to one of the function keys, such that in response to the user pressing the assigned mark function key, the image cell currently highlighted is marked to provide a marked image. In response to the user repeating the above step, a group of marked images is created. The method and system further includes assigning at least one group function to one of the function keys, such that in response to a user pressing the assigned group function key, the group of marked images is collectively manipulated by the user.

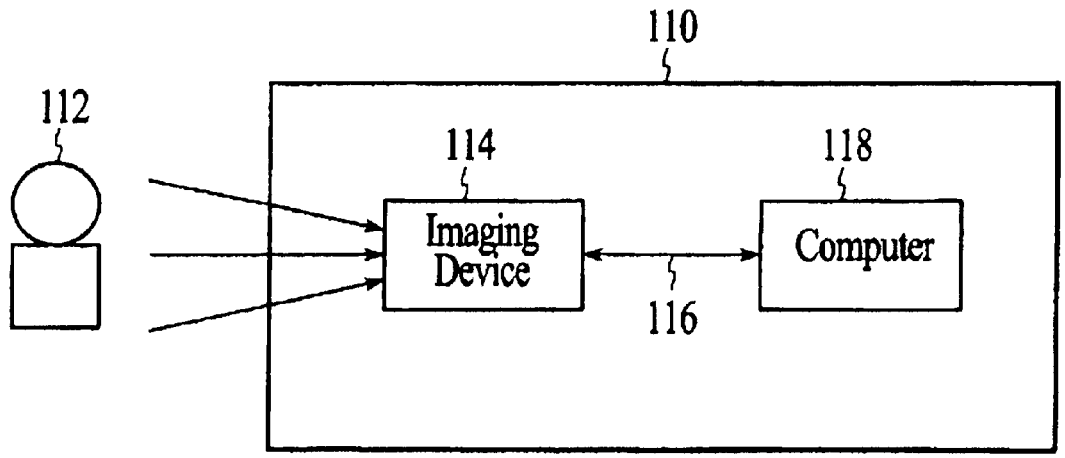

U.S. PATENT DOCUMENTS

| | | |
|---|---|---|
| 4,234,890 A | 11/1980 | Astle et al. |
| 4,325,080 A | 4/1982 | Satoh |
| 4,337,479 A | 6/1982 | Tomimoto et al. |
| 4,347,618 A | 8/1982 | Kavouras et al. |
| 4,364,650 A | 12/1982 | Terashita et al. |
| 4,403,303 A | 9/1983 | Howes et al. |
| 4,416,282 A | 11/1983 | Saulson et al. |
| 4,456,931 A | 6/1984 | Toyoda et al. |
| 4,466,230 A | 8/1984 | Osselaere et al. |
| 4,470,067 A | 9/1984 | Mino |
| 4,471,382 A | 9/1984 | Toyoda et al. |
| 4,519,692 A | 5/1985 | Michalik |
| 4,531,161 A | 7/1985 | Murakoshi |
| 4,540,276 A | 9/1985 | Ost |
| 4,574,319 A | 3/1986 | Konishi |
| 4,601,055 A | 7/1986 | Kent |
| 4,623,930 A | 11/1986 | Oshima et al. |
| 4,691,253 A | 9/1987 | Silver |
| 4,723,169 A | 2/1988 | Kaji |
| 4,736,224 A | 4/1988 | Watanabe et al. |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm et al. |
| 4,827,347 A | 5/1989 | Bell |
| 4,855,831 A | 8/1989 | Miyamoto et al. |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi et al. |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori et al. |
| 4,972,495 A | 11/1990 | Blike et al. |
| 4,982,291 A | 1/1991 | Kurahashi et al. |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson et al. |
| 5,018,017 A | 5/1991 | Sasaki et al. |
| 5,020,012 A | 5/1991 | Stockberger et al. |
| 5,021,989 A | 6/1991 | Fujisawa et al. |
| 5,027,150 A | 6/1991 | Inoue et al. |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski et al. |
| 5,040,070 A | 8/1991 | Higashitsutsumi et al. |
| 5,043,801 A | 8/1991 | Watanabe |
| 5,043,816 A | 8/1991 | Nakano et al. |
| 5,057,924 A | 10/1991 | Yamada et al. |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash et al. |
| 5,101,364 A | 3/1992 | Davenport et al. |
| 5,106,107 A | 4/1992 | Justus et al. |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts et al. |
| 5,138,460 A | 8/1992 | Egawa |
| 5,140,358 A | 8/1992 | Tokunaga et al. |
| 5,142,319 A | 8/1992 | Wakabayashi et al. |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki et al. |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short et al. |
| 5,164,751 A | 11/1992 | Weyer |
| 5,164,831 A | 11/1992 | Kuchta et al. |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty et al. |
| 5,193,538 A | 3/1993 | Ekwall |
| 5,194,944 A | 3/1993 | Uchiyama et al. |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein et al. |
| 5,220,420 A | 6/1993 | Hoarty et al. |
| 5,220,614 A | 6/1993 | Crain |
| 5,223,935 A | 6/1993 | Tsuji et al. |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki et al. |
| 5,237,648 A | 8/1993 | Mills et al. |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka et al. |
| 5,253,071 A | 10/1993 | Mackay |
| 5,260,795 A | 11/1993 | Sakai et al. |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies, Jr. et al. |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga et al. |
| 5,335,072 A | 8/1994 | Tanaka et al. |
| 5,341,466 A | 8/1994 | Perlin et al. |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack et al. |
| 5,367,318 A | 11/1994 | Beaudin et al. |
| 5,373,153 A | 12/1994 | Cumberledge et al. |
| 5,375,160 A | 12/1994 | Guidon et al. |

| Patent | Type | Date | Inventor |
|---|---|---|---|
| 5,386,111 | A | 1/1995 | Zimmerman |
| 5,386,177 | A | 1/1995 | Uhm |
| 5,386,552 | A | 1/1995 | Garney |
| 5,390,026 | A | 2/1995 | Lim |
| 5,390,314 | A | 2/1995 | Swanson |
| 5,392,462 | A | 2/1995 | Komaki |
| 5,396,343 | A | 3/1995 | Hanselman |
| 5,402,170 | A | 3/1995 | Parulski et al. |
| 5,402,171 | A | 3/1995 | Tagami et al. |
| 5,404,316 | A | 4/1995 | Klingler et al. |
| 5,404,505 | A | 4/1995 | Levinson |
| 5,408,265 | A | 4/1995 | Sasaki |
| 5,414,811 | A | 5/1995 | Parulski et al. |
| 5,416,556 | A | 5/1995 | Suzuki et al. |
| 5,420,635 | A | 5/1995 | Konishi et al. |
| 5,425,137 | A | 6/1995 | Mohan et al. |
| 5,428,733 | A | 6/1995 | Carr |
| 5,432,871 | A | 7/1995 | Novik |
| 5,432,900 | A | 7/1995 | Rhodes et al. |
| 5,434,618 | A | 7/1995 | Hayashi et al. |
| 5,434,958 | A | 7/1995 | Surma et al. |
| 5,434,969 | A | 7/1995 | Heilveil et al. |
| 5,436,657 | A | 7/1995 | Fukuoka |
| 5,436,659 | A | 7/1995 | Vincent |
| 5,440,401 | A | 8/1995 | Parulski et al. |
| 5,442,465 | A | 8/1995 | Compton |
| 5,444,482 | A | 8/1995 | Misawa et al. |
| 5,448,372 | A | 9/1995 | Axman et al. |
| 5,452,145 | A | 9/1995 | Wakui et al. |
| 5,459,830 | A | 10/1995 | Ohba et al. |
| 5,461,429 | A | 10/1995 | Konishi et al. |
| 5,463,728 | A | 10/1995 | Blahut et al. |
| 5,463,729 | A | 10/1995 | Kitaguchi et al. |
| 5,465,133 | A | 11/1995 | Aoki et al. |
| 5,467,288 | A | 11/1995 | Fasciano et al. |
| 5,473,370 | A | 12/1995 | Moronaga et al. |
| 5,473,371 | A | 12/1995 | Choi |
| 5,475,428 | A | 12/1995 | Hintz et al. |
| 5,475,441 | A | 12/1995 | Parulski et al. |
| 5,475,812 | A | 12/1995 | Corona et al. |
| 5,477,264 | A | 12/1995 | Sarbadhikari et al. |
| 5,481,330 | A | 1/1996 | Yamasaki |
| 5,481,667 | A | 1/1996 | Bieniek et al. |
| 5,486,853 | A | 1/1996 | Baxter et al. |
| 5,488,414 | A | 1/1996 | Hirasawa et al. |
| 5,489,945 | A | 2/1996 | Kannegundla et al. |
| 5,489,955 | A | 2/1996 | Satoh et al. |
| 5,493,332 | A | 2/1996 | Dalton et al. |
| 5,493,335 | A | 2/1996 | Parulski et al. |
| 5,495,342 | A | 2/1996 | Harigaya et al. |
| 5,495,559 | A | 2/1996 | Makino |
| 5,496,106 | A | 3/1996 | Anderson |
| 5,497,193 | A | 3/1996 | Mitsuhashi et al. |
| 5,500,936 | A | 3/1996 | Allen et al. |
| 5,502,486 | A | 3/1996 | Ueda et al. |
| 5,510,830 | A | 4/1996 | Ohia et al. |
| 5,512,941 | A | 4/1996 | Takahashi et al. |
| 5,513,306 | A | 4/1996 | Mills et al. |
| 5,513,342 | A | 4/1996 | Leong et al. |
| 5,515,101 | A | 5/1996 | Yoshida |
| 5,517,606 | A | 5/1996 | Matheny et al. |
| 5,519,815 | A | 5/1996 | Klassen |
| 5,521,639 | A | 5/1996 | Tomura et al. |
| 5,521,663 | A | 5/1996 | Norris, III |
| 5,521,717 | A | 5/1996 | Maeda |
| 5,521,841 | A | 5/1996 | Arman et al. |
| 5,523,786 | A | 6/1996 | Parulski |
| 5,523,857 | A | 6/1996 | Fukushima |
| 5,525,957 | A | 6/1996 | Tanaka |
| 5,528,293 | A | 6/1996 | Watanabe |
| 5,528,315 | A | 6/1996 | Sugiyama |
| 5,530,235 | A | 6/1996 | Stefik et al. |
| 5,532,740 | A | 7/1996 | Wakui |
| 5,534,975 | A | 7/1996 | Stefik et al. |
| 5,537,151 | A | 7/1996 | Orr et al. |
| 5,537,530 | A | 7/1996 | Edgar et al. |
| 5,539,528 | A | 7/1996 | Tawa |
| 5,539,535 | A | 7/1996 | Aizawa et al. |
| 5,539,658 | A | 7/1996 | McCullough |
| 5,541,656 | A | 7/1996 | Kare et al. |
| 5,548,371 | A | 8/1996 | Kawahara et al. |
| 5,548,409 | A | 8/1996 | Ohta et al. |
| 5,550,646 | A | 8/1996 | Hassan et al. |
| 5,550,938 | A | 8/1996 | Hayakawa et al. |
| 5,552,806 | A | 9/1996 | Lenchik |
| 5,553,277 | A | 9/1996 | Hirano et al. |
| 5,555,193 | A | 9/1996 | Tsinberg et al. |
| 5,559,554 | A | 9/1996 | Uekane et al. |
| 5,560,022 | A | 9/1996 | Dunstan et al. |
| 5,563,655 | A | 10/1996 | Lathrop |
| 5,568,167 | A | 10/1996 | Galbi et al. |
| 5,568,192 | A | 10/1996 | Hannah |
| 5,572,233 | A | 11/1996 | Kakegawa |
| 5,574,933 | A | 11/1996 | Horst |
| 5,576,757 | A | 11/1996 | Roberts et al. |
| 5,576,759 | A | 11/1996 | Kawamura et al. |
| 5,577,190 | A | 11/1996 | Peters |
| 5,578,757 | A | 11/1996 | Roth |
| 5,579,048 | A | 11/1996 | Hirasawa |
| 5,579,450 | A | 11/1996 | Hanyu et al. |
| 5,581,311 | A | 12/1996 | Kuroiwa |
| 5,585,845 | A | 12/1996 | Kawamura et al. |
| 5,587,740 | A | 12/1996 | Brennan |
| 5,589,902 | A | 12/1996 | Gruel et al. |
| 5,590,306 | A | 12/1996 | Watanabe et al. |
| 5,592,301 | A | 1/1997 | Shimada |
| 5,594,524 | A | 1/1997 | Sasagaki et al. |
| 5,597,193 | A | 1/1997 | Conner |
| 5,606,365 | A | 2/1997 | Maurinus et al. |
| 5,608,491 | A | 3/1997 | Sasagaki et al. |
| 5,610,653 | A | 3/1997 | Abecassis |
| 5,619,738 | A | 4/1997 | Petruchik et al. |
| 5,621,459 | A | 4/1997 | Ueda et al. |
| 5,621,906 | A | 4/1997 | O'Neill |
| 5,625,412 | A | 4/1997 | Aciu et al. |
| 5,630,017 | A | 5/1997 | Gasper et al. |
| 5,631,701 | A | 5/1997 | Miyake |
| 5,631,871 | A | 5/1997 | Park et al. |
| 5,633,573 | A | 5/1997 | Van Phuoc et al. |
| 5,633,678 | A | 5/1997 | Parulski et al. |
| 5,633,976 | A | 5/1997 | Ogino |
| 5,634,000 | A | 5/1997 | Wicht |
| 5,635,983 | A | 6/1997 | Ohmori |
| 5,635,984 | A | 6/1997 | Lee |
| 5,637,871 | A | 6/1997 | Piety et al. |
| 5,638,123 | A | 6/1997 | Yamaguchi |
| 5,638,498 | A | 6/1997 | Tyler et al. |
| 5,638,501 | A | 6/1997 | Gough et al. |
| 5,640,193 | A | 6/1997 | Wellner |
| 5,640,202 | A | 6/1997 | Kondo et al. |
| 5,640,204 | A | 6/1997 | Tsutsui |
| 5,640,627 | A | 6/1997 | Nakano et al. |
| 5,644,694 | A | 7/1997 | Appleton |
| 5,648,816 | A | 7/1997 | Wakui |
| 5,649,032 | A | 7/1997 | Burt et al. |
| 5,649,186 | A | 7/1997 | Ferguson |
| 5,651,107 | A | 7/1997 | Frank et al. |
| 5,659,547 | A | 8/1997 | Scarr et al. |
| 5,659,729 | A | 8/1997 | Nielsen |
| 5,664,087 | A | 9/1997 | Tani et al. |
| 5,666,580 | A | 9/1997 | Ito et al. |
| 5,668,639 | A | 9/1997 | Martin |

| Patent | Date | Inventor |
|---|---|---|
| 5,671,378 A | 9/1997 | Acker et al. |
| 5,671,440 A | 9/1997 | Curry |
| 5,673,304 A | 9/1997 | Connor et al. |
| 5,674,003 A | 10/1997 | Andersen et al. |
| 5,675,358 A | 10/1997 | Bullock et al. |
| 5,675,752 A | 10/1997 | Scott et al. |
| 5,680,533 A | 10/1997 | Yamato et al. |
| 5,680,534 A | 10/1997 | Yamato et al. |
| 5,682,197 A | 10/1997 | Moghadam et al. |
| 5,682,207 A | 10/1997 | Takeda et al. |
| 5,682,326 A | 10/1997 | Klingler et al. |
| 5,682,441 A | 10/1997 | Ligtenberg et al. |
| 5,684,511 A | 11/1997 | Westerink et al. |
| 5,684,542 A | 11/1997 | Tsukagoshi |
| 5,687,408 A | 11/1997 | Park |
| 5,699,109 A | 12/1997 | Nishimura et al. |
| 5,703,644 A | 12/1997 | Mori et al. |
| 5,706,049 A | 1/1998 | Moghadam et al. |
| 5,706,097 A | 1/1998 | Schelling et al. |
| 5,706,457 A | 1/1998 | Dwyer et al. |
| 5,708,810 A | 1/1998 | Kern et al. |
| 5,711,330 A | 1/1998 | Nelson |
| 5,719,967 A | 2/1998 | Sekine |
| 5,719,978 A | 2/1998 | Kakii et al. |
| 5,719,987 A | 2/1998 | Kawamura et al. |
| 5,721,908 A | 2/1998 | Lagarde et al. |
| 5,721,909 A | 2/1998 | Oulid-Aissa et al. |
| 5,724,070 A | 3/1998 | Denninghoff et al. |
| 5,724,475 A | 3/1998 | Kirsten |
| 5,724,579 A | 3/1998 | Suzuki |
| 5,727,112 A | 3/1998 | Kellar et al. |
| 5,727,159 A | 3/1998 | Kikinis |
| 5,729,289 A | 3/1998 | Etoh |
| 5,734,427 A | 3/1998 | Hayashi |
| 5,734,436 A | 3/1998 | Abe et al. |
| 5,734,915 A | 3/1998 | Roewer |
| 5,737,032 A | 4/1998 | Stenzel et al. |
| 5,737,476 A | 4/1998 | Kim |
| 5,737,491 A | 4/1998 | Allen et al. |
| 5,740,267 A | 4/1998 | Echerer et al. |
| 5,740,801 A | 4/1998 | Branson |
| 5,742,339 A | 4/1998 | Wakui |
| 5,742,475 A | 4/1998 | Riddiford |
| 5,742,504 A | 4/1998 | Meyer et al. |
| 5,742,659 A | 4/1998 | Atac et al. |
| 5,742,698 A | 4/1998 | Minami et al. |
| 5,748,326 A | 5/1998 | Thompson-Bell et al. |
| 5,748,831 A | 5/1998 | Kubo |
| 5,751,350 A | 5/1998 | Tanaka |
| 5,752,244 A | 5/1998 | Rose et al. |
| 5,754,873 A | 5/1998 | Nolan |
| 5,757,418 A | 5/1998 | Inagaki |
| 5,757,427 A | 5/1998 | Miyaguchi |
| 5,757,468 A | 5/1998 | Patton et al. |
| 5,758,180 A | 5/1998 | Duffy et al. |
| 5,760,767 A | 6/1998 | Shore et al. |
| 5,761,655 A | 6/1998 | Hoffman |
| 5,761,686 A | 6/1998 | Bloomberg |
| 5,764,276 A | 6/1998 | Martin et al. |
| 5,764,291 A | 6/1998 | Fullam |
| 5,767,897 A | 6/1998 | Howell |
| 5,767,904 A | 6/1998 | Miyake |
| 5,769,713 A | 6/1998 | Katayama |
| 5,771,034 A | 6/1998 | Gibson |
| 5,773,810 A | 6/1998 | Hussey et al. |
| 5,774,131 A | 6/1998 | Kim |
| 5,781,175 A | 7/1998 | Hara |
| 5,781,650 A | 7/1998 | Lobo et al. |
| 5,781,798 A | 7/1998 | Beatty et al. |
| 5,784,177 A | 7/1998 | Sanchez et al. |
| 5,784,525 A | 7/1998 | Bell |
| 5,784,629 A | 7/1998 | Anderson et al. |
| 5,786,851 A | 7/1998 | Kondo et al. |
| D396,853 S | 8/1998 | Cooper et al. |
| 5,790,094 A | 8/1998 | Tanigawa et al. |
| 5,790,800 A | 8/1998 | Gauvin et al. |
| 5,796,428 A | 8/1998 | Matsumoto et al. |
| 5,796,875 A | 8/1998 | Read |
| 5,797,051 A | 8/1998 | McIntyre et al. |
| 5,801,685 A | 9/1998 | Miller et al. |
| 5,801,770 A | 9/1998 | Paff et al. |
| 5,801,773 A | 9/1998 | Ikeda |
| 5,805,153 A | 9/1998 | Nielsen |
| 5,805,163 A | 9/1998 | Bagnas |
| 5,805,829 A | 9/1998 | Cohen et al. |
| 5,806,005 A | 9/1998 | Hull et al. |
| 5,806,072 A | 9/1998 | Kuba et al. |
| 5,815,160 A | 9/1998 | Kikuchi et al. |
| 5,815,201 A | 9/1998 | Hashimoto et al. |
| 5,818,977 A | 10/1998 | Tansley |
| 5,819,103 A | 10/1998 | Endoh et al. |
| 5,821,997 A | 10/1998 | Kawamura et al. |
| 5,822,492 A | 10/1998 | Wakui et al. |
| 5,822,581 A | 10/1998 | Christeson |
| 5,828,406 A | 10/1998 | Parulski et al. |
| 5,828,793 A | 10/1998 | Mann |
| 5,831,590 A | 11/1998 | Ikedo |
| 5,831,872 A | 11/1998 | Pan et al. |
| 5,835,761 A | 11/1998 | Ishii et al. |
| 5,835,772 A | 11/1998 | Thurlo |
| 5,838,325 A | 11/1998 | Deen et al. |
| 5,841,422 A | 11/1998 | Shyu |
| 5,841,471 A | 11/1998 | Endsley et al. |
| 5,845,166 A | 12/1998 | Fellegara et al. |
| 5,847,706 A | 12/1998 | Kingsley |
| 5,848,193 A | 12/1998 | Garcia |
| 5,848,420 A | 12/1998 | Xu |
| 5,850,483 A | 12/1998 | Takabatake et al. |
| 5,852,502 A | 12/1998 | Beckett |
| 5,861,918 A | 1/1999 | Anderson et al. |
| 5,862,218 A | 1/1999 | Steinberg |
| 5,867,214 A | 2/1999 | Anderson et al. |
| 5,870,756 A | 2/1999 | Nakata et al. |
| 5,873,007 A | 2/1999 | Ferrada Suarez |
| 5,874,959 A | 2/1999 | Rowe |
| 5,877,746 A | 3/1999 | Parks et al. |
| 5,881,205 A | 3/1999 | Andrew et al. |
| 5,883,610 A | 3/1999 | Jeon |
| 5,892,511 A | 4/1999 | Gelsinger et al. |
| 5,892,847 A | 4/1999 | Johnson |
| 5,896,131 A | 4/1999 | Alexander |
| 5,896,203 A | 4/1999 | Shibata |
| 5,898,434 A | 4/1999 | Small et al. |
| 5,898,779 A | 4/1999 | Squilla et al. |
| 5,898,833 A | 4/1999 | Kidder |
| 5,900,909 A | 5/1999 | Parulski et al. |
| 5,901,303 A | 5/1999 | Chew |
| 5,903,309 A | 5/1999 | Anderson |
| 5,903,786 A | 5/1999 | Goto |
| 5,907,315 A | 5/1999 | Vlahos et al. |
| 5,910,805 A | 6/1999 | Hickey et al. |
| 5,917,488 A | 6/1999 | Anderson et al. |
| 5,920,726 A | 7/1999 | Anderson |
| 5,926,208 A | 7/1999 | Noonen et al. |
| 5,929,904 A | 7/1999 | Uchida |
| 5,933,137 A | 8/1999 | Anderson |
| 5,937,106 A | 8/1999 | Murayama |
| 5,938,766 A | 8/1999 | Anderson et al. |
| 5,940,080 A | 8/1999 | Ruehle et al. |
| 5,940,121 A | 8/1999 | Mcintyre et al. |
| 5,943,050 A | 8/1999 | Bullock et al. |
| 5,943,093 A | 8/1999 | Anderson et al. |

| Patent No. | Date | Inventor |
|---|---|---|
| 5,949,408 A | 9/1999 | Kang et al. |
| 5,949,432 A | 9/1999 | Gough et al. |
| 5,949,474 A | 9/1999 | Gerszberg et al. |
| 5,949,496 A | 9/1999 | Kim |
| 5,949,950 A | 9/1999 | Kubo |
| 5,956,084 A | 9/1999 | Moronaga et al. |
| 5,963,670 A | 10/1999 | Lipson et al. |
| 5,966,122 A | 10/1999 | Itoh |
| 5,969,718 A | 10/1999 | Mills et al. |
| 5,969,761 A | 10/1999 | Takahashi et al. |
| 5,973,691 A | 10/1999 | Servan-Schreiber |
| 5,973,694 A | 10/1999 | Steele et al. |
| 5,973,734 A | 10/1999 | Anderson |
| 5,974,386 A | 10/1999 | Ejima et al. |
| 5,977,975 A | 11/1999 | Mugura et al. |
| 5,977,976 A | 11/1999 | Maeda |
| 5,977,985 A | 11/1999 | Ishii et al. |
| 5,978,016 A | 11/1999 | Lourette et al. |
| 5,978,020 A | 11/1999 | Watanabe et al. |
| 5,978,607 A | 11/1999 | Teremy et al. |
| 5,982,350 A | 11/1999 | Hekmatpour et al. |
| 5,982,429 A | 11/1999 | Kamamoto et al. |
| 5,983,297 A | 11/1999 | Noble et al. |
| 5,986,701 A | 11/1999 | Anderson et al. |
| 5,987,223 A | 11/1999 | Narukawa et al. |
| 5,991,465 A | 11/1999 | Anderson et al. |
| 5,991,515 A | 11/1999 | Fall et al. |
| 5,993,137 A | 11/1999 | Harr |
| 5,999,173 A | 12/1999 | Ubillos |
| 5,999,191 A | 12/1999 | Frank et al. |
| 5,999,207 A | 12/1999 | Rodriguez et al. |
| 5,999,740 A | 12/1999 | Rowley |
| 6,003,093 A | 12/1999 | Kester |
| 6,005,613 A | 12/1999 | Endsley et al. |
| 6,005,618 A | 12/1999 | Fukui et al. |
| 6,006,039 A | 12/1999 | Steinberg et al. |
| 6,009,336 A | 12/1999 | Harris et al. |
| 6,011,585 A | 1/2000 | Anderson |
| 6,011,926 A | 1/2000 | Cockell |
| 6,012,088 A | 1/2000 | Li et al. |
| 6,015,093 A | 1/2000 | Barrett et al. |
| 6,020,920 A | 2/2000 | Anderson |
| 6,020,982 A | 2/2000 | Yamauchi et al. |
| 6,022,315 A | 2/2000 | Iliff |
| 6,023,241 A | 2/2000 | Clapper |
| 6,023,697 A | 2/2000 | Bates et al. |
| 6,025,827 A | 2/2000 | Bullock et al. |
| 6,028,603 A | 2/2000 | Wang et al. |
| 6,028,611 A | 2/2000 | Anderson et al. |
| 6,031,964 A | 2/2000 | Anderson |
| 6,035,323 A | 3/2000 | Narayen et al. |
| 6,035,359 A | 3/2000 | Enoki |
| 6,037,972 A | 3/2000 | Horiuchi et al. |
| 6,038,545 A | 3/2000 | Mandeberg et al. |
| 6,052,555 A | 4/2000 | Ferguson |
| 6,052,692 A | 4/2000 | Anderson et al. |
| 6,058,428 A | 5/2000 | Wang et al. |
| 6,072,479 A | 6/2000 | Ogawa |
| 6,072,480 A | 6/2000 | Gorbet et al. |
| 6,072,489 A | 6/2000 | Gough et al. |
| 6,075,905 A | 6/2000 | Herman et al. |
| 6,078,005 A | 6/2000 | Kurakake et al. |
| 6,078,756 A | 6/2000 | Squilla et al. |
| 6,082,827 A | 7/2000 | McFall |
| 6,084,990 A | 7/2000 | Suzuki et al. |
| 6,091,846 A | 7/2000 | Lin et al. |
| 6,091,956 A | 7/2000 | Hollenberg |
| 6,094,221 A | 7/2000 | Andersion |
| 6,097,389 A | 8/2000 | Morris et al. |
| 6,097,430 A | 8/2000 | Komiya et al. |
| 6,097,431 A | 8/2000 | Anderson et al. |
| 6,111,604 A | 8/2000 | Hashimoto et al. |
| 6,118,480 A | 9/2000 | Anderson et al. |
| 6,122,003 A | 9/2000 | Anderson |
| 6,122,005 A | 9/2000 | Sasaki et al. |
| 6,122,409 A | 9/2000 | Boggs et al. |
| 6,128,013 A | 10/2000 | Prabhu et al. |
| 6,128,413 A | 10/2000 | Benamara |
| 6,137,468 A | 10/2000 | Martinez et al. |
| 6,137,534 A | 10/2000 | Anderson |
| 6,141,044 A | 10/2000 | Anderson et al. |
| 6,144,362 A | 11/2000 | Kawai |
| 6,147,703 A | 11/2000 | Miller et al. |
| 6,147,709 A | 11/2000 | Martin et al. |
| 6,157,394 A | 12/2000 | Anderson et al. |
| 6,161,131 A | 12/2000 | Garfinkle |
| 6,167,469 A | 12/2000 | Safai et al. |
| 6,169,575 B1 | 1/2001 | Anderson et al. |
| 6,169,725 B1 | 1/2001 | Gibbs et al. |
| 6,175,663 B1 | 1/2001 | Huang |
| 6,177,956 B1 | 1/2001 | Anderson et al. |
| 6,177,957 B1 | 1/2001 | Anderson |
| 6,188,431 B1 | 2/2001 | Oie |
| 6,188,432 B1 | 2/2001 | Ejima |
| 6,188,782 B1 | 2/2001 | Le Beux |
| 6,204,877 B1 | 3/2001 | Kiyokawa |
| 6,205,485 B1 | 3/2001 | Kikinis |
| 6,209,048 B1 | 3/2001 | Wolff |
| 6,211,870 B1 | 4/2001 | Foster |
| 6,215,523 B1 | 4/2001 | Anderson |
| 6,222,538 B1 | 4/2001 | Anderson |
| 6,223,190 B1 | 4/2001 | Aihara et al. |
| 6,226,449 B1 | 5/2001 | Inoue et al. |
| 6,229,566 B1 | 5/2001 | Matsumoto et al. |
| 6,230,307 B1 | 5/2001 | Davis et al. |
| 6,233,015 B1 | 5/2001 | Miller et al. |
| 6,237,010 B1 | 5/2001 | Hui et al. |
| 6,239,794 B1 | 5/2001 | Yuen et al. |
| 6,239,837 B1 | 5/2001 | Yamada et al. |
| 6,246,430 B1 | 6/2001 | Peters et al. |
| 6,249,316 B1 | 6/2001 | Anderson |
| 6,256,063 B1 | 7/2001 | Saito et al. |
| 6,262,769 B1 | 7/2001 | Anderson et al. |
| 6,275,260 B1 | 8/2001 | Anderson |
| 6,278,447 B1 | 8/2001 | Anderson |
| 6,285,398 B1 | 9/2001 | Shinsky et al. |
| 6,292,218 B1 | 9/2001 | Parulski et al. |
| RE37,431 E | 10/2001 | Lanier et al. |
| 6,300,950 B1 | 10/2001 | Clark et al. |
| 6,304,851 B1 | 10/2001 | Kmack et al. |
| 6,307,544 B1 | 10/2001 | Harding |
| 6,310,647 B1 | 10/2001 | Parulski et al. |
| 6,310,648 B1 | 10/2001 | Miller et al. |
| 6,317,141 B1 | 11/2001 | Pavley et al. |
| 6,334,025 B1 | 12/2001 | Yamagami |
| 6,353,848 B1 | 3/2002 | Morris |
| 6,356,281 B1 | 3/2002 | Isenman |
| 6,356,357 B1 | 3/2002 | Anderson et al. |
| 6,380,972 B1 | 4/2002 | Suga et al. |
| 6,400,375 B1 | 6/2002 | Okudaira |
| 6,400,471 B1 | 6/2002 | Kuo et al. |
| 6,426,771 B1 | 7/2002 | Kosugi |
| 6,437,829 B1 | 8/2002 | Webb et al. |
| 6,441,854 B2 | 8/2002 | Fellegara et al. |
| 6,441,927 B1 | 8/2002 | Dow et al. |
| 6,445,412 B1 | 9/2002 | Shiohara |
| 6,473,123 B1 | 10/2002 | Anderson |
| 6,483,602 B1 | 11/2002 | Haneda |
| 6,486,914 B1 | 11/2002 | Anderson |
| 6,493,028 B1 | 12/2002 | Anderson et al. |
| 6,504,575 B1 | 1/2003 | Ramirez et al. |
| 6,507,362 B1 | 1/2003 | Akerib |

| | | | |
|---|---|---|---|
| 6,512,548 B1 | 1/2003 | Anderson | |
| 6,515,704 B1 | 2/2003 | Sato | |
| 6,532,039 B2 | 3/2003 | Anderson | |
| 6,536,357 B1 | 3/2003 | Hiestand | |
| 6,538,698 B1 | 3/2003 | Anderson | |
| 6,563,535 B1 | 5/2003 | Anderson | |
| 6,563,542 B1 | 5/2003 | Hatakenaka et al. | |
| 6,567,122 B1 | 5/2003 | Anderson et al. | |
| 6,571,271 B1 | 5/2003 | Savitzky et al. | |
| 6,682,207 B2 | 1/2004 | Weber et al. | |
| 6,683,649 B1 | 1/2004 | Anderson | |
| 6,738,075 B1 | 5/2004 | Torres et al. | |
| 6,747,692 B2 | 6/2004 | Patel et al. | |
| 6,765,612 B1 | 7/2004 | Anderson et al. | |
| 6,779,153 B1 | 8/2004 | Kagle | |
| 6,803,945 B1 | 10/2004 | Needham | |
| 6,806,906 B1 | 10/2004 | Soga et al. | |
| 6,897,891 B2 | 5/2005 | Itsukaichi | |
| 6,965,400 B1 | 11/2005 | Haba et al. | |
| 7,050,143 B1 | 5/2006 | Silverbrook et al. | |
| 7,215,371 B2 | 5/2007 | Fellegara et al. | |
| 7,337,403 B2 | 2/2008 | Pavley et al. | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0729271 A2 | 8/1996 | |
| EP | 0449106 B1 | 12/1996 | |
| EP | 0817476 A2 | 1/1998 | |
| EP | 0821522 A2 | 1/1998 | |
| EP | 0835011 A1 | 4/1998 | |
| EP | 0860735 A2 | 8/1998 | |
| EP | 0860982 A2 | 8/1998 | |
| EP | 0890919 A1 | 1/1999 | |
| GB | 2245749 A | 1/1992 | |
| GB | 2289555 A | 11/1995 | |
| JP | 55-142470 A | 11/1980 | |
| JP | 55-142471 A | 11/1980 | |
| JP | 62-271178 A | 11/1987 | |
| JP | 1-132173 A | 5/1989 | |
| JP | 1-238382 A | 9/1989 | |
| JP | 1-319870 A | 12/1989 | |
| JP | 2-42489 A | 2/1990 | |
| JP | 2-162420 A | 6/1990 | |
| JP | 2-257262 A | 10/1990 | |
| JP | 2-280484 A | 11/1990 | |
| JP | 3-117181 A | 5/1991 | |
| JP | 3-231574 A | 10/1991 | |
| JP | 3-246766 A | 11/1991 | |
| JP | 3-506111 A | 12/1991 | |
| JP | 4-115788 A | 4/1992 | |
| JP | 4-120889 A | 4/1992 | |
| JP | 4-230517 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | 5-260351 A | 10/1993 | |
| JP | 5-289838 A | 11/1993 | |
| JP | 5-290143 | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |
| JP | 6-103352 A | 4/1994 | |
| JP | 6-105266 A | 4/1994 | |
| JP | 6-178261 A | 6/1994 | |
| JP | 6-197299 A | 7/1994 | |
| JP | 6-265794 A | 9/1994 | |
| JP | 6-290103 A | 10/1994 | |
| JP | 6-348467 A | 12/1994 | |
| JP | 6-350949 | 12/1994 | |
| JP | 6-350949 A | 12/1994 | |
| JP | 7-6028 A | 1/1995 | |
| JP | 7-160842 | 6/1995 | |
| JP | 7-160842 A | 6/1995 | |
| JP | 7-168852 A | 7/1995 | |
| JP | 7-184160 A | 7/1995 | |
| JP | 7-221911 A | 8/1995 | |
| JP | 7-245723 A | 9/1995 | |
| JP | 7-274060 A | 10/1995 | |
| JP | 7-274108 A | 10/1995 | |
| JP | 7-295873 A | 11/1995 | |
| JP | 8-32847 A | 2/1996 | |
| JP | 8-502840 A | 3/1996 | |
| JP | 8-111845 A | 4/1996 | |
| JP | 8-114849 A | 5/1996 | |
| JP | 8-116476 A | 5/1996 | |
| JP | 8-140025 A | 5/1996 | |
| JP | 8-147952 A | 6/1996 | |
| JP | 8-205014 A | 8/1996 | |
| JP | 8-223524 A | 8/1996 | |
| JP | 8-249450 A | 9/1996 | |
| JP | 8-279034 A | 10/1996 | |
| JP | 8-331495 A | 12/1996 | |
| JP | 8-339297 A | 12/1996 | |
| JP | 9-27939 A | 1/1997 | |
| JP | 9-37139 A | 2/1997 | |
| JP | 9-163275 A | 6/1997 | |
| JP | 9-171213 A | 6/1997 | |
| JP | 9-311850 A | 12/1997 | |
| JP | 10-4535 A | 1/1998 | |
| JP | 10-162020 A | 6/1998 | |
| JP | 10-243331 A | 9/1998 | |
| JP | 2000-92439 A | 3/2000 | |
| JP | 2000-510616 A | 8/2000 | |
| JP | 2000-287110 A | 10/2000 | |
| JP | 2001-501416 A | 1/2001 | |
| WO | WO-91/14334 A1 | 9/1991 | |
| WO | WO-92/05652 A2 | 4/1992 | |
| WO | WO-92/05655 A1 | 4/1992 | |
| WO | WO-92/09169 A1 | 5/1992 | |
| WO | WO-92/20186 A1 | 11/1992 | |
| WO | WO-94/23375 A1 | 10/1994 | |
| WO | WO-95/32583 A1 | 11/1995 | |
| WO | WO-96/02106 A1 | 1/1996 | |
| WO | WO-96/29818 A1 | 9/1996 | |
| WO | WO-97/17669 A1 | 5/1997 | |
| WO | WO-97/38510 A1 | 10/1997 | |
| WO | WO-98/14887 A1 | 4/1998 | |

OTHER PUBLICATIONS

*Sony Digital Still Camera DCS–F1 Operating Instructions*, pp. 1–6, 16–17, 22–25, and 57–58, published 1996.

"Laboratory Analysis—Data Link: The Future of Camera Technology," *Popular Photography*, Sep. 1993, pp. 48.

"PCMCIA for PowerBook 500 Computers," *Applefacts Online*, 1994 <http://product.info.apple.com/producinginfo/factsheets/pcmcia.html>.

"YCC Color Space," Oct. 3, 2000, <http://www.aols.com/colorite/yccspace.html>.

"MM4850: Image Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire*, Oct. 7, 1998.

Grimm, Leigh, "The Manipulation Proclamation," *Photo Trade News*, Feb. 1997, p. 66.

"Kodak DC3400 Zoom—Distinctive New Kodak DC3400 Zoom Digital Camera Offers Easy–to–Use Features, Stylish New Look, All at Affortable Price," *Kodak Press Release*, Aug. 1, 2000.

Hauf et al., "The FlashPix™ Image File Format," *The Fourth Color Imaging Conference: Color Science, Systems and Applications*, 1996, pp. 234–238.

Watanabe et al., "An Image Data File Format for Digital Still Camera," *IS&T's 48th Annual Conference Proceedings*, May 1995, vol. 48, pp. 421–424.

"Disk Drive with Embedded Hyper—Text Markup Language Server," *IBM Technical Disclosure Bulletin*, vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software!," printed Apr. 15, 999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics*, vol. 44, No. 3, Aug. 1998, pp. 686–691.

Mann, Steve, "Headmounted Wireless Video: Computer–Supported Collaboration for Photojuornalism and Everyday Use," *IEEE Communications Magazines*, vol. 36, No. 6, Jun. 1998, pp. 144–151.

Williams, Martyn, "Review—NEC PC–DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image–Capture Platform," *Apple Directions*, Aug. 1996.

"Device Drivers via the Access Bus," *IBM Technical Disclosure Bulletin*, vol. 39, No. 1, Jan. 1996, pp. 135–136.

Degann et al., "Still Images Retrieval from a Remote Database: The System *Imagine*," *Signal Proceeding: Image Communication*, vol. 5, No. 3, May 1993, pp. 219–234.

"Getting Started With Your Macintosh LC III," cover and inside cover page, p. 21, 1992.

"User's Guide Microsoft Windows & MS–DOS 6,"Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing*, Nikkei Business Publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible*, Third Edition, Nov. 1991, pp. 63–64, 324, 931, 945, Goldstein & Blair, Berkeley, California.

*Liquid Crystal Digital Camera QV–10B Owner's Manual*, Casio, 1995, pp. 1–89, Casio Computer Co., Ltd.

Foley et al., *Introduction to Computer Graphics*, 1994, 1990, pp. 505–509, Addison–Wesley Publishing Company, Inc.

Foley et al., *Computer Graphics—Principles and Practice, Second Edition*, Jun. 15, 1990, pp. 754–759, Addison–Wesley Publication Company, Inc.

*Inside Macintosh* Apple Computer, 1993, pp. 1–5 to 1–8 and 4–1 to 4–46, Apple Computer Inc., Cupertino California.

Kroiak et al., "A Declaration of Device Independence," *ESD: The Electronic System Design Magazine*, May 1988, pp. 63–65, vol. 18, No. 5.

Melville et al., "An Application Programmer's Interface for Digital Cameras," Imaging Science and Technology $49^{th}$ Annual Conference, May 19–24, 1996, The Society for Imaging Science and Technology.

*Picona PC–DC200 PC–DC200K User's Manual*, Feb. 1997, NEC Corporation.

Posnak et al., "An Adaptive Framework for Developing Multimedia Software Components," *Communications of the ACM*, Oct. 1997, pp. 43–47, vol. 40, No. 10, ACM.

*Ricoh Digital Camera RDC–1 Instruction Manual*, Ricoh Ricoh Americas Corp., Ricoh Co., Ltd. Japan.

Shimizu et al., "The Digital Camera Using New Compression and Interpolation Algorithm," IS&T $49^{th}$ Annual Conference, May 19–24, 1996, pp. 268–272, IS&T, Springfield, Virginia.

Skelton et al., "Design and Development of a Transportable Image Processing and GIS System," *Infrared Image Processing and Enhancement*, May 20–21, 1987, pp. 187–191, vol. 781, SPIE, Bellingham, Washington.

*Texas Instruments TI–85 Guidebook*, 1993, Texas Instruments Incorporated.

*Texas Instruments TI–92 Guidebook*, 1995, Texas Instruments Incorporated.

*VxWorks Programmer's Guide*, 1984–1999, Wind River Systems, Inc.

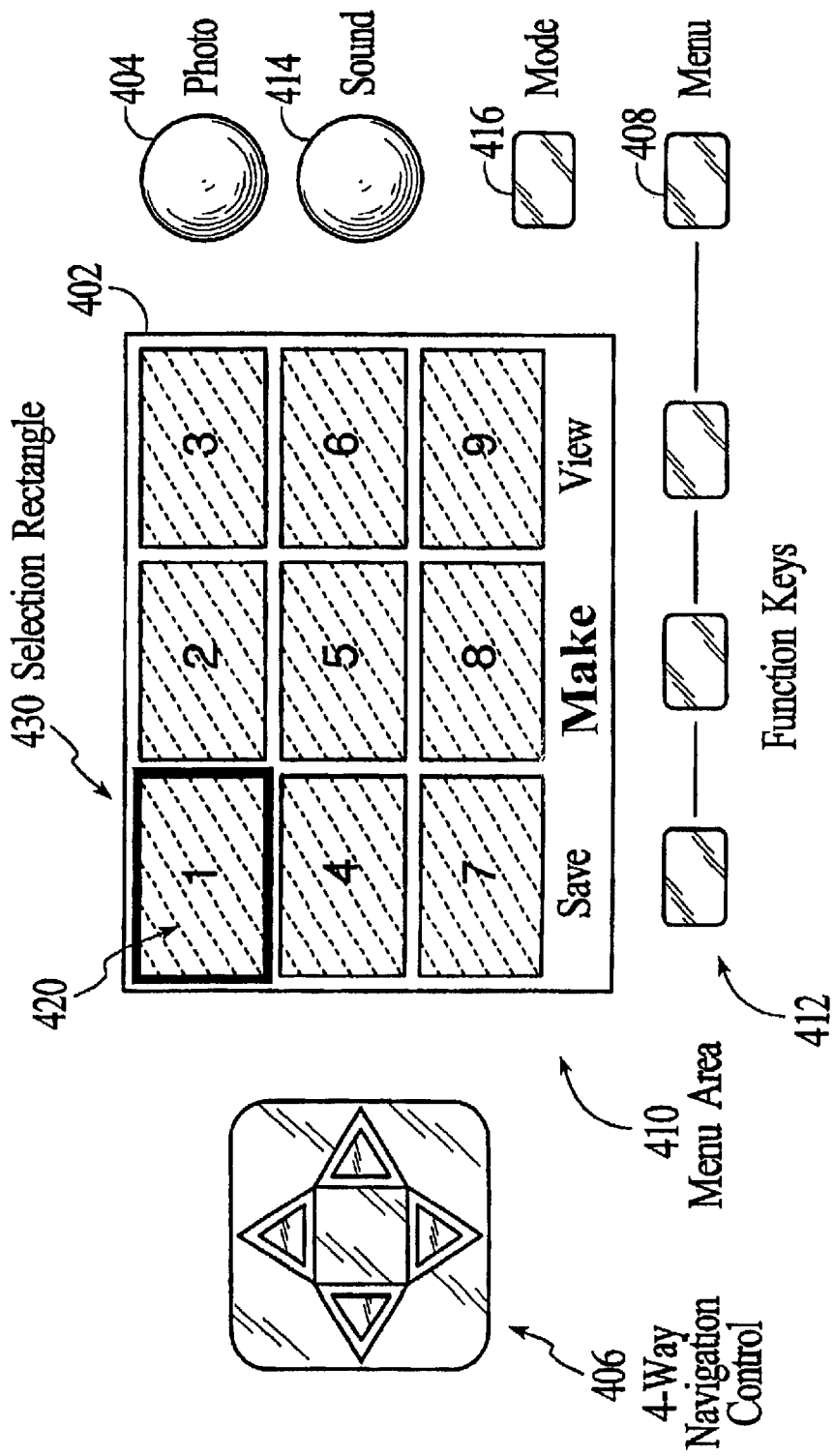
FIG. 5 (Amended)

US 6,249,316 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

Figure No. 5, the word "Mark" has been changed to "Make".

AS A RESULT OF REEXAMINATION, IT HAS BEEN DETERMINED THAT:

Claim 9 is cancelled.

Claims 1, 7, 8, 10 and 12 are determined to be patentable as amended.

Claims 2-6 and 11, dependent on an amended claim, are determined to be patentable.

New claims 13-119 are added and determined to be patentable.

1. A method for grouping a series of images stored in a digital camera, the digital camera including a view finder for displaying the stored images, a navigation control button, and one or more function keys, the method comprising the steps of:

(a) allowing a user to navigate among the displayed images using the navigation control button;

(b) allowing the user to randomly select one of the displayed images;

(c) assigning a mark function to one of the function keys, such that in response to a user pressing the assigned mark function key, the image currently selected is marked to provide a marked image;

(d) repeating steps (a) through (c) to create a temporary group of marked images; and (e) assigning at least one group function to one of the function keys, such that in response to the user pressing the assigned group function key, the group of marked images is collectively manipulated by the user within the digital camera,

*wherein the displayed images are concurrently displayed on the digital camera as an array, and wherein the navigation control button is a four-way navigation control button.*

7. [A method as in claim 1 further including the steps of:] *A method for grouping a series of images stored in a digital camera, the digital camera including a view finder for displaying the stored images, a navigation control button, and one or more function keys, the method comprising the steps of:*

(a) *allowing a user to navigate among the displayed images using the navigation control button;*

(b) *allowing the user to randomly select one of the displayed images;*

(c) *assigning a mark function to one of the function keys, such that in response to a user pressing the assigned mark function key, the image currently selected is marked to provide a marked image;*

(d) *repeating steps (a) through (c) to create a temporary group of marked images;*

(e) *assigning at least one group function to one of the function keys, such that in response to the user pressing the assigned group function key, the group of marked images is collectively manipulated by the user within the digital camera; and*

[(d)] (*f*) assigning an unmark function to one of the function keys, such that in response to the user pressing the assigned unmark function key, the image currently selected is unmarked.

8. A method for grouping a series of images stored in a digital camera, the digital camera including a navigation control button, one or more function keys, and a view finder for displaying stored images, the method comprising the steps of:

(a) allowing a user to navigate among the displayed images using the navigation control button;

(b) allowing the user to randomly select one of the displayed images;

(c) enabling the user to mark the selected image using a corresponding function key;

(d) displaying a mark indication on the selected image in response to the user pressing the corresponding function key;

(e) repeating steps (a) through (d) to provide a temporary group of marked images;

(f) enabling the user to select one of the functions of saving the group, deleting the group, and creating a slide show from the group using a corresponding function key; [and]

(g) saving the group, deleting the group, and creating a slide show from the group in response to the user pressing the appropriate function key*,*

(*h*) *allowing the user to unmark the selected image using a corresponding function key; and*

(*i*) *removing the mark indication from the selected image in response to the user pressing the corresponding function key.*

10. [A method as in claim 9 further including the steps of:] *A method for grouping a series of images stored in a digital camera, the digital camera including a navigation control button, one or more function keys, and a view finder for displaying stored images, the method comprising the steps of:*

(a) *allowing a user to navigate among the displayed images using the navigation control button;*

(b) *allowing the user to randomly select one of the displayed images;*

(c) *enabling the user to mark the selected image using a corresponding function key;*

(d) *displaying a mark indication on the selected image in response to the user pressing the corresponding function key;*

(e) *repeating steps (a) through (d) to provide a temporary group of marked images;*

(f) *enabling the user to select one of the functions of saving the group, deleting the group, and creating a slide show from the group using a corresponding function key; and*

(g) *saving the group, deleting the group, and creating a slide show from the group in response to the user press-* ing the appropriate function key, wherein step (d) further includes the step of:
(d1) providing a mark number as the mark indication;
(h) allowing the user to unmark the selected image using a corresponding function key; and
(i) removing the mark indication from the selected image in response to the user pressing the corresponding function key.

12. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created *and for assigning an unmark function to one of the function keys, such that in response to the user pressing the assigned unmark function key, the image currently selected is unmarked;* and
means coupled to the memory manager for assigning at least one group function to one of the function keys, such that in response to a user pressing the assigned group function key, the group of marked images is collectively manipulated by the user, within the digital camera.

13. The method as in claim 1 further comprising providing an unmark function, such that in response to the user pressing an assigned unmark function key, the image currently selected is unmarked.

14. The method of claim 7 wherein the at least one group function is a delete function and the temporary group of marked images is collectively manipulated by deleting each of the marked image in the temporary group of marked images.

15. The method of claim 7 wherein the at least one group function is a save function and the temporary group of marked images is collectively manipulated by saving each of the marked images in the temporary group of marked images in a location identified by the user.

16. The method of claim 15 wherein the location is at least one of a folder and a directory.

17. The method of claim 7 wherein the at least one group function is a label function and the temporary group of marked images is collectively manipulated by associating a label with each of the marked images in the temporary group of marked images.

18. The method of claim 17 wherein the label is entered by the user.

19. The method of claim 7 wherein the at least one group function is a slide show function and the temporary group of marked images is collectively manipulated by generating a slide show with each of the marked images in the temporary group of marked images.

20. The method of claim 7 wherein the at least one group function is a save function and the temporary group of marked images is collectively manipulated by saving each of the marked images in the temporary group of marked images in a single file.

21. The method of claim 7 wherein the at least one group function is a duplicate function and the temporary group of marked images is collectively manipulated by duplicating each of the marked images in the temporary group of marked images in a single file.

22. A method for grouping a series of images stored in a digital camera, the digital camera including a view finder for displaying the stored images, a navigation control button, and one or more function keys, the method comprising the steps of:
(a) allowing a user to navigate among the displayed images using the navigation control button;
(b) allowing the user to randomly select one of the displayed images;
(c) assigning a mark function to one of the function keys, such that in response to a user pressing the assigned mark function key, the image currently selected is marked to provide a marked image;
(d) repeating steps (a) through (c) to create a temporary group of marked images;
(e) assigning at least one group function to one of the function keys, such that in response to the user pressing the assigned group function key, the group of marked images is collectively manipulated by the user within the digital camera; and
(f) providing a visual indication with the images currently selected as the user navigates from one image to another through the displayed images, wherein when the user navigates from a first image of the displayed images to a second image of the displayed images, the visual indication transitions from the first image to the second image, and
wherein the displayed images are concurrently displayed on the digital camera as an array.

23. The method of claim 22 wherein the array is a grid and the displayed images are concurrently displayed as a grid.

24. The method of claim 13 wherein the navigation control button allows the user to navigate in at least two dimensions through the grid displayed images.

25. The method of claim 22 wherein the displayed images are concurrently displayed as thumbnails.

26. The method of claim 22 wherein the visual indication provides a highlight for the image currently selected.

27. The method of claim 26 wherein the highlight is a border that encircles the image currently selected.

28. The method of claim 22 wherein the marked image is marked at least in part by displaying a mark indicium in a cell in which the marked image is displayed.

29. The method of claim 28 wherein the mark indicium is displayed on the marked image.

30. The method of claim 29 wherein the mark indicium comprises a number.

31. The method of claim 29 wherein the mark indicium comprises a check mark.

32. The method of claim 29 wherein the mark indicium comprises a graphic.

33. The method of claim 28 wherein the mark indicium comprises a number.

34. The method of claim 28 wherein the mark indicium comprises a graphic.

35. A method for grouping a series of images stored in a digital camera, the digital camera including a view finder for displaying the stored images, a navigation control button, and one or more function keys, the method comprising the steps of:
  (a) allowing a user to navigate among the displayed images using the navigation control button;
  (b) allowing the user to randomly select one of the displayed images;
  (c) assigning a mark function to one of the function keys, such that in response to a user pressing the assigned mark function key, the image currently selected is marked to provide a marked image;
  (d) repeating steps (a) through (c) to create a temporary group of marked images;
  (e) assigning at least one group function to one of the function keys, such that in response to the user pressing the assigned group function key, the group of marked images is collectively manipulated by the user within the digital camera,
  wherein the displayed images are concurrently displayed on the digital camera as an array,
  wherein the marked image is marked at least in part by displaying a mark indicium in a cell in which the marked image is displayed, and
  wherein the mark indicium comprises a check mark.

36. A method for grouping a series of images stored in a digital camera, the digital camera including a view finder for displaying the stored images, a navigation control button, and one or more function keys, the method comprising the steps of;
  (a) allowing a user to navigate among the displayed images using the navigation control button;
  (b) allowing the user to randomly select one of the displayed images;
  (c) assigning a mark function to one of the function keys, such that in response to a user pressing the assigned mark function key, the image currently selected is marked to provide a marked image;
  (d) repeating steps (a) through (c) to create a temporary group of marked images;
  (e) assigning at least one group function to one of the function keys, such that in response to the user pressing the assigned group function key, the group of marked images is collectively manipulated by the user within the digital camera; and
  wherein the displayed images are concurrently displayed on the digital camera as an array,
  wherein the marked image is marked at least in part by displaying a mark indicium in a cell in which the marked image is displayed, and
  (f) displaying a total number of marked images in the temporary group of marked images.

37. The method of claim 36 wherein the total number of the marked images is displayed in the cell of a most recently marked image of the temporary group of marked images.

38. A method for grouping a series of images stored in a digital camera, the digital camera including a view finder for displaying the stored images, a navigation control button, and one or more function keys, the method comprising the steps of:
  (a) allowing a user to navigate among the displayed images using the navigation control button;
  (b) allowing the user to randomly select one of the displayed images;
  (c) assigning a mark function to one of the function keys, such that in response to a user pressing the assigned mark function key, the image currently selected is marked to provide a marked image;
  (d) repeating steps (a) through (c) to create a temporary group of marked images;
  (e) assigning at least one group function to one of the function keys, such that in response to the user pressing the assigned group function key, the group of marked images is collectively manipulated by the user within the digital camera;
  (f) upon changing to a different menu, assigning a new function other than the at least one group function to the one of the function keys that is the assigned group function key; and
  (g) in response to the user pressing the one of the function keys while in the different menu, implementing the new function, wherein the displayed images are concurrently displayed on the digital camera as an array.

39. The method of claim 38 further comprising displaying a first label that identifies the at least one group function upon assigning the at least group function to the one of the function keys and displaying a second label that identifies the new function upon assigning the new function to the one of the function keys.

40. The method of claim 39 wherein the first label and the second label are displayed in direct association with one of the function keys.

41. The method of claim 40 wherein the one of the function keys is provided adjacent the view finder, and when displayed, the first label and the second label are displayed in an area of the view finder that is substantially adjacent the one of the function keys, such that the one of the function keys is a soft key.

42. The method of claim 41 wherein a plurality of the function keys are soft keys.

43. A method for grouping a series of images stored in a digital camera, the digital camera including a view finder for displaying the stored images, a navigation control button, and one or more function keys, the method comprising the steps of:
  (a ) allowing a user to navigate among the displayed images using the navigation control button;
  (b) allowing the user to randomly select one of the displayed images;
  (c) assigning a mark function to one of the function keys, such that in response to a user pressing the assigned mark function key, the image currently selected is marked to provide a marked image;
  (d) repeating steps (a) through (c) to create a temporary group of marked images;
  (e) assigning at least one group function to one of the function keys, such that in response to the user pressing the assigned group function key, the group of marked images is collectively manipulated by the user within the digital camera, and
  wherein the displayed images are concurrently displayed on the digital camera as an array,
  wherein the temporary group of marked images is collectively manipulated by prompting the user to confirm that the temporary group of marked images to be collectively manipulated according to the at least one group function, and upon receiving confirmation from the user, manipulating each marked image of the temporary group of marked images according to the at least one group function without further manual intervention.

44. The method of claim 43 wherein the at least one group function is a delete function and the temporary group of marked images is collectively manipulated by deleting each of the marked images in the temporary group of marked images.

45. The method as in claim 44 further comprising providing an unmark function, such that in response to the user pressing an assigned unmark function key, the image currently selected is unmarked.

46. A method for grouping a series of images stored in a digital camera, the digital camera including a view finder for displaying the stored images, a navigation control button, and one or more function keys, the method comprising the steps of:

(a) allowing a user to navigate among the displayed images using the navigation control button;

(b) allowing the user to randomly select one of the displayed images;

(c) assigning a mark function to one of the function keys, such that in response to a user pressing the assigned mark function key, the image currently selected is marked to provide a marked image;

(d) repeating steps (a) through (c) to create a temporary group of marked images;

(e) assigning at least one group function to one of the function keys, such that in response to the user pressing the assigned group function key, the group of marked images is collectively manipulated by the user within the digital camera, wherein the displayed images are concurrently displayed on the digital camera as an array, and wherein the at least one group function is an ordering function and the temporary group of marked images is collectively manipulated by placing each of the marked images in the temporary group of marked images in a defined order.

47. A method for grouping a series of images stored in a digital camera, the digital camera including a view finder for displaying the stored images, a navigation control button, and one or more function keys, the method comprising the steps of;

(a) allowing a user to navigate among the displayed images using the navigation control button;

(b) allowing the user to randomly select one of the displayed images;

(c) assigning a mark function to one of the function keys, such that in response to a user pressing the assigned mark function key, the image currently selected is marked to provide a marked image;

(d) repeating steps (a) through (c) to create a temporary group of marked images;

(e) assigning at least one group function to one of the function keys, such that in response to the user pressing the assigned group function key, the group of marked images is collectively manipulated by the user within the digital camera, wherein:
the displayed images are concurrently displayed on the digital camera as an array;
the displayed images are concurrently displayed as thumbnails;
the marked image is marked at least in part by displaying a mark indicium in a cell in which the marked image is displayed; and
the method further comprises providing a visual indication with the image currently selected as the user navigates from one image to another through the displayed images, wherein when the user navigates from a first image of the displayed images to a second image of the displayed images, the visual indication transitions from the first image to the second image.

48. The method of claim 47 wherein the temporary group of marked images is collectively manipulated by prompting the user to confirm that the temporary group of marked images is to be collectively manipulated according to the at least one group function, and upon receiving confirmation from the user, manipulating each marked image of the temporary group of marked images according to the at least one group function without further manual intervention.

49. The method of claim 48 wherein the at least one group function is a delete function and the temporary group of marked images is collectively manipulated by deleting each of the marked images in the temporary group of marked images.

50. The method of claim 47 further comprising:
upon changing to a different menu, assigning a new function other than the at least one group function to the one of the function keys that is the assigned group function key; and
in response to the user pressing the one of the function keys while in the different menu, implementing the new function.

51. The method of claim 50 further comprising displaying a first label that identifies the at least one group function upon assigning the at least one group function to the one of the function keys, and displaying a second label that identifies the new function upon assigning the new function to the one of the function keys.

52. The method of claim 51 wherein the first label and the second label are displayed in direct association with the one of the function keys.

53. The method of claim 52 wherein the one of the function keys is provided adjacent the view finder, and when displayed, the first label and the second label are displayed in an area of the view finder that is substantially adjacent the one of the function keys, such that the one of the function keys is a soft key.

54. The method of claim 47 wherein the visual indication provides a border that encircles the image currently selected.

55. The method of claim 47 wherein the array is a grid, the displayed images are concurrently displayed as a grid, and the navigation control button allows the user to navigate in at least two dimensions through the grid of displayed images.

56. The method of claim 47 wherein:
the temporary group of marked images is collectively manipulated by prompting the user to confirm that the temporary group of marked images is to be collectively manipulated according to the at least one group function, and upon receiving confirmation from the user, manipulating each marked image of the temporary group of marked images according to the at least one group function without further manual intervention;

the at least one group function is a delete function and the temporary group of marked images is collectively manipulated by deleting each of the marked images in the temporary group of marked images;

the visual indication provides a border that encircles the images currently selected; and the array is a grid, the displayed images are concurrently displayed as a grid, and the navigation control button allows the user to navigate in at least two dimensions through the grid of displayed images.

57. *The method as in claim 56 further comprising providing an unmark function, such that in response to the user pressing an assigned unmark function key, the image currently selected is unmarked.*

58. *The method of claim 47 further comprising:*

*upon changing to a different menu, assigning a new function other than the at least one group function to the one of the function keys that is the assigned group function key; and*

*in response to the user pressing the one of the function keys while in the different menu, implementing the new function.*

59. *The method of claim 58 further comprising displaying a first label that identifies the at least one group function upon assigning the at least one group function to the one of the function keys, and displaying a second label that identifies the new function upon assigning the new function to the one of the function keys, wherein the first label and the second label are displayed in direct association with the one of the function keys and the one of the function keys is provided adjacent the view finder, and when displayed, the first label and the second label are displayed in an area of the view finder that is substantially adjacent the one of the function keys, such that the one of the function keys is a soft key.*

60. *The method as in claim 47 further comprising providing an unmark function, such that in response to the user pressing an assigned unmark function key, the image currently selected is unmarked.*

61. *A method for grouping a series of images stored in a digital camera, the digital camera including a navigation control button, one or more function keys, and a view finder for displaying stored images, the method comprising the steps of:*

(a) *allowing a user to navigate among the displayed images using the navigation control button;*

(b) *allowing the user to randomly select one of the displayed images;*

(c) *enabling the user to mark the selected image using a corresponding function key;*

(d) *displaying a mark indication on the selected image in response to the user pressing the corresponding function key;*

(e) *repeating steps (a) through (d) to provide a temporary group of marked images;*

(f) *enabling the user to select one of the functions of saving the group, deleting the group, and creating a slide show from the group using a corresponding function key;*

(g) *saving the group, deleting the group, and creating a slide show from the group in response to the user pressing the appropriate function key,*

*wherein:*

*the selected one of the functions is deleting the group;*
*the displayed images are concurrently displayed on the digital camera as an array;*
*the displayed images are concurrently displayed as thumbnails; and*

*wherein, as the user navigates among the displayed images, further comprising providing a visual indication to identify an image to which the user has navigated, wherein when the user navigates from a first image of the displayed images to a second image of the displayed images, the visual indication transitions from the first image to the second image.*

62. *The method of claim 61 wherein the visual indication provides a border to encircle the image to which the user has navigated.*

63. *The method as in claim 61 further comprising allowing the user to unmark the selected image using a corresponding function key and removing the mark indication from the selected image in response to the user pressing the corresponding function key.*

64. *A method for grouping a series of images stored in a digital camera, the digital camera including a navigation control button, one or more function keys, and a view finder for displaying stored images, the method comprising the steps of:*

(a) *allowing a user to navigate among the displayed images using the navigation control button;*

(b) *allowing the user to randomly select one of the displayed images;*

(c) *enabling the user to mark the selected image using a corresponding function key;*

(d) *displaying a mark indication on the selected image in response to the user pressing the corresponding function key;*

(e) *repeating steps (a) through (d) to provide a temporary group of marked images;*

(f) *enabling the user to select one of the functions of saving the group, deleting the group, and creating a slide show from the group using a corresponding function key;*

(g) *saving the group, deleting the group, and creating a slide show from the group in response to the user pressing the appropriate function key,*

*wherein:*

*the selected one of the functions is deleting the group;*
*the displayed images are concurrently displayed on the digital camera as an array;*
*the displayed images are concurrently displayed as thumbnails; and*

*wherein deleting the group comprises prompting the user to confirm that the temporary group of marked images is to be deleted, and upon receiving confirmation from the user, deleting each marked image of the temporary group of marked images without further manual intervention.*

65. *The method of claim 64 further comprising:*

*upon changing to a different menu, assigning a new function other than a delete function to the appropriate function key; and*

*in response to the user pressing the appropriate function key while in the different menu, implementing the new function.*

66. *The method of claim 65, further comprising displaying a first label that identifies the delete function assigning the delete function to the appropriate function key and displaying a second label that identifies the new function upon assigning the new function to the appropriate function key.*

67. *The method of claim 66 wherein the first label and the second label are displayed in direct association with the one of the function keys.*

68. *The method of claim 67, wherein the appropriate function key is provided adjacent the view finder, and when displayed, the first label and the second label are displayed in an area of the view finder that is substantially adjacent the* appropriate function key, such that the appropriate function key is a soft key.

69. The method of claim 64 wherein the array is a grid, the displayed images are concurrently displayed as a grid, and the navigation control button allows the user to navigate in at least two dimensions through the grid of displayed images.

70. The method as in claim 64 further comprising allowing the user to unmark the selected image using a corresponding function key and removing the mark indication from the selected image in response to the user pressing the corresponding function key.

71. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array; and
wherein the temporary group of marked images is collectively manipulated by prompting the user to conform that the temporary group of marked images is to be collectively manipulated according to the at least one group function, and upon receiving confirmation from the user, manipulating each marked image of the temporary group of marked images according to the at least one group function without further manual intervention.

72. The digital camera device of claim 71 wherein the at least one group function is a delete function and the temporary group of marked images is collectively manipulated by deleting each of the marked images in the temporary group of marked images.

73. The digital camera device of claim 72 wherein the plurality of images is concurrently displayed on the digital camera as an array.

74. The digital camera device of claim 73 wherein the array is a grid and the plurality of images is concurrently displayed as a grid.

75. The digital camera device of claim 74 wherein the navigation control button allows the user to navigate in at least two dimensions through the grid of the plurality of images.

76. The digital camera device of claim 73 wherein the plurality of images are concurrently displayed as thumbnails.

77. The digital camera device of claim 72 wherein the means coupled to the memory manager for assigning a mark function to one of the function keys is further configured for providing an unmark function such that in response to the user pressing an unmark function key, the image currently selected is unmarked.

78. The digital camera device of claim 72 wherein a marked image of the temporary group of marked images is marked at least in part by displaying a mark indicium in a cell in which the marked image is displayed.

79. The digital camera device of claim 78 wherein the mark indicium is displayed on the marked image.

80. The digital camera device of claim 79 wherein the mark indicium comprises a number.

81. The digital camera device of claim 79 wherein the mark indicium comprises a check mark.

82. The digital camera device of claim 79 wherein the mark indicium comprises a graphic.

83. The digital camera device of claim 78 wherein the mark indicium comprise a number.

84. The digital camera device of claim 78 wherein the mark indicium comprises a graphic.

85. The digital camera device of claim 71 wherein the at least one group function is a delete function and the temporary group of marked images is collectively manipulated by deleting each of the marked images in the temporary group of marked images.

86. The digital camera device of claim 71 wherein the at least one group function is a save function and the temporary group of marked images is collectively manipulated by saving each of the marked images in the temporary group of marked images in a location identified by the user.

87. The digital camera device of claim 86 wherein the location is at least one of a folder and a directory.

88. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to a user pressing the assigned group function key, the group of marked images is collectively manipulated by the user, within the digital camera,
wherein the plurality of images is concurrently displayed on the digital camera as an array; and
wherein a visual indication is provided with the selected image as the user navigates from one image to another through the plurality of images, wherein when the user navigates from a first image of the plurality of images to a second image of the plurality of images, the visual indication transitions from the first image to the second image.

89. The digital camera device of claim 88 wherein the visual indication provides a highlight for the selected image.

90. The digital camera device of claim 89 wherein the highlight is a border that encircles the selected image.

91. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array; and
wherein a marked image of the temporary group of marked images is marked at least in part by displaying a mark indicium in a cell in which the marked image is displayed; and
wherein the marked indicium comprises a check mark.

92. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array;
wherein a marked image of the temporary group of marked images is marked at least in part by displaying a mark indicium in a cell in which the marked image is displayed; and
wherein the interface is further configured to display a total number of marked images in the temporary group of marked images.

93. The digital camera device of claim 92 wherein the total number of the marked images is displayed in the cell of a most recently marked image of the temporary group of marked images.

94. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array; and
wherein the means coupled to the memory manager is further configured for:
upon changing to a different menu, assigning a new function other than the at least one group function to the one of the function keys that is the assigned group function key; and
in response to the user pressing the one of the function keys while in the different menu, implementing the new function.

95. The digital camera device of claim 94 wherein the interface is further configured to display a first label that identifies the at least one group function upon assigning the at least one group function to the one of the function keys, and displaying a second label that identifies the new function upon assigning the new function to the one of the function keys.

96. The digital camera device of claim 95 wherein the first label and the second label are displayed in direct association with the one of the function keys.

97. The digital camera device of claim 96 wherein the one of the function keys is provided adjacent the view finder, and when displayed, the first label and the second label are displayed in an area of the view finder that is substantially adjacent the one of the function keys, such that the one of the function keys is a soft key.

98. The digital camera device of claim 97 wherein a plurality of the function keys are soft keys.

99. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array; and
wherein the means to navigate comprises a four-way navigation control button.

100. The digital camera device of claim 99 wherein the at least one group function is a label function and the temporary group of marked images is collectively manipulated by associating a label with each of the marked images in the temporary group of marked images.

101. The digital camera device of claim 96 wherein the label is entered by the user.

102. The digital camera device of claim 99 wherein the at least one group function is a slide show function and the temporary group of marked images is collectively manipulated by generating a slide show with each of the marked images in the temporary group of marked images.

103. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to the user pressing the assigned group function key, the group of marked images is collectively manipulated by the user, within the digital camera,
wherein the plurality of images is concurrently displayed on the digital camera as an array; and
wherein the at least one group function is an ordering function and the temporary group of marked images is collectively manipulated by placing each of the marked images in the temporary group of marked images in a defined order.

104. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and
means coupled to the memory manager for assigning at least one group function to one of the function keys, such that in response to a user pressing the assigned group function key, the group of marked images is collectively manipulated by the user, within the digital camera,
wherein the plurality of images is concurrently displayed on the digital camera as an array; and
wherein the at least one group function is a save function and the temporary group of marked images is collectively manipulated by saving each of the marked images in the temporary group of marked images in a single file.

105. A digital camera device comprising:
a memory device for storing sets of image data;
a memory manager for allocating storage locations within said memory device to store said sets of image data;
an interface coupled to said memory device whereby an external host computer can access said sets of image data stored in said memory device;
a user interface for displaying a plurality of images corresponding to the image data, the user interface including a plurality of function keys, and means to navigate among and randomly select one of the plurality of images;
means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and means coupled to the memory manager for assigning at least one group function to one of the function keys, such that in response to a user pressing the assigned group function key, the group of marked images is collectively manipulated by the user, within the digital camera, wherein the plurality of images is concurrently displayed on the digital camera as an array; and wherein the at least one group function is a duplicate function and the temporary group of marked images is collectively manipulated by duplicating each of the marked images in the temporary group of marked images in a single file.

106. A digital camera device comprising:

a memory device for storing sets of image data;

a memory manager for allocating storage locations within said memory device to store said sets of image data;

an interface coupled to said memory device whereby an external host computer can access said sets of image data stored in said memory device;

a user interface for displaying a plurality of images corresponding to the image data, the user interface including a plurality of function keys, and means to navigate among and randomly select one of the plurality of images;

means coupled to the memory manager for assigning a mark function to one of the function keys, such that in response to the user pressing the assigned mark function key, the selected image is marked, such that in response to the user repeatedly selecting images and pressing the assigned mark function key, a temporary group of marked images is created; and means coupled to the memory manager for assigning at least one group function to one of the function keys, such that in response to a user pressing the assigned group function key, the group of marked images is collectively manipulated by the user, within the digital camera, wherein:

the plurality of images are concurrently displayed on the digital camera as an array;

the plurality of displayed images are concurrently displayed as thumbnails;

a marked image of the temporary group of marked images is marked at least in part by displaying a mark indicium in a cell in which the marked image is displayed; and the user interface is further configured to provide a visual indication with a currently selected image as the user navigates from one image to another through the plurality of images, wherein when the user navigates from a first image of the plurality of images to a second image of the plurality of images, the visual indication transitions from the first image to the second image.

107. The digital camera device of claim 106 wherein the temporary group of marked images is collectively manipulated by prompting the user to confirm that the temporary group of marked images is to be collectively manipulated according to the at least one group function, and upon receiving confirmation from the user, manipulating each marked image of the temporary group of marked images according to the at least one group function without further manual intervention.

108. The digital camera device of claim 107 wherein the at least one group function is a delete function and the temporary group of marked images is collectively manipulated by deleting each of the marked images in the temporary group of marked images.

109. The digital camera device of claim 107 wherein the means coupled to the memory manager for assigning a mark function to one of the function keys is further configured for providing an unmark function such that in response to the user pressing an unmark function key, the image currently selected is unmarked.

110. The digital camera device of claim 106 wherein the means coupled to the memory manager is further configured for:

upon changing to a different menu, assigning a new function other than the at least one group function to the one of the function keys that is the assigned group function key; and in response to the user pressing the one of the function keys while in the different menu, implementing the new function.

111. The digital camera device of claim 110 wherein the user interface is further configured to display a first label that identifies the at least one group function upon assigning the at least one group function to the one of the function keys and displaying a second label that identifies the new function upon assigning the new function to the one of the function keys.

112. The digital camera device of claim 111 wherein the first label and the second label are displayed in direct association with the one of the function keys.

113. The digital camera device of claim 112 wherein the one of the function keys is substantially adjacent a display provided by the user interface, and when displayed, the first label and the second label are displayed in an area of the display that is substantially adjacent the one of the function keys, such that the one of the function keys is a soft key.

114. The digital camera device of claim 106 wherein the visual indication provides a border that encircles the currently selected image.

115. The digital camera device of claim 106 wherein the array is a grid, the plurality of images are concurrently displayed as a grid, and the means for navigating allows the user to navigate in at least two dimensions through the grid of displayed images.

116. The digital camera device of claim 106 wherein:

the temporary group of marked images is collectively manipulated by prompting the user to confirm that the temporary group of marked images is to be collectively manipulated according to the at least one group function, and upon receiving confirmation from the user, manipulating each marked image of the temporary group of marked images according to the at least one group function without further manual intervention;

the at least one group function is a delete function and the temporary group of marked images is collectively manipulated by deleting each marked image in the temporary group of marked images;

the visual indication provides a border that encircles a currently selected one of the plurality of images; and the array is a grid, the plurality of images are concurrently displayed as a grid, and the means for navigation allows the user to navigate in at least two dimensions through the grid.

117. The digital camera device of claim 116 wherein the means coupled to the memory manager is further configured for:

upon changing to a different menu, assigning a new function other than the at least one group function to the once of the function keys that is the assigned group function key; and in response to the user pressing the one of the function keys while in the different menu, implementing the new function.

118. The digital camera device of claim 117 wherein the user interface is further configured to display a first label that identifies the at least one group function upon assigning the at least one group function to the one of the function keys, and displaying a second label that identifies the new function upon assigning the new function to the one of the function keys, wherein the first label and the second label are displayed in direct association with the one of the function keys and the one of the function keys is substantially adjacent a display provided by the user interface, and when displayed, the first label and the second label are displayed in an area of the display that is substantially adjacent the one of the function keys, such that the one of the function keys is a soft key.

119. The digital camera device of claim 116 wherein the means coupled to the memory manager for assigning a mark function to one of the function keys is further configured for providing an unmark function such that in response to the user pressing an unmark function key, the image currently selected is unmarked.

* * * * *